US008780166B2

(12) United States Patent
Shanmukhadas et al.

(10) Patent No.: US 8,780,166 B2
(45) Date of Patent: Jul. 15, 2014

(54) COLLABORATIVE RECORDING OF A VIDEOCONFERENCE USING A RECORDING SERVER

(75) Inventors: Binu Kaiparambil Shanmukhadas, Bangalore (IN); Hrishikesh G. Kulkarni, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 640 days.

(21) Appl. No.: 13/094,062

(22) Filed: Apr. 26, 2011

(65) Prior Publication Data

US 2012/0274731 A1 Nov. 1, 2012

(51) Int. Cl.
*H04N 7/14* (2006.01)
*H04N 5/77* (2006.01)
*G06F 15/16* (2006.01)

(52) U.S. Cl.
USPC .................. 348/14.08; 348/14.01; 348/14.09; 348/14.1; 348/14.13; 370/261; 386/224; 386/329; 455/412.1; 709/204

(58) Field of Classification Search
CPC ......... H04N 7/15; H04N 7/147; H04N 7/155; H04M 3/567; G06Q 50/22
USPC ............ 348/14.01, 14.08, 14.09, 14.1, 14.13; 386/224, 329; 709/204; 370/261; 455/412.1
See application file for complete search history.

(56) References Cited

U.S. PATENT DOCUMENTS

| | | | |
|---|---|---|---|
| 4,020,462 | A | 4/1977 | Morrin, II |
| 4,737,863 | A | 4/1988 | Eto et al. |
| 4,855,843 | A | 8/1989 | Ive |
| 5,694,481 | A | 12/1997 | Lam et al. |
| 6,025,870 | A | 2/2000 | Hardy |
| 6,257,693 | B1 | 7/2001 | Miller et al. |
| 6,359,902 | B1 | 3/2002 | Putzolu |
| 6,587,456 | B1 | 7/2003 | Rao et al. |
| 6,741,608 | B1 | 5/2004 | Bouis et al. |
| 6,816,904 | B1 | 11/2004 | Ludwig et al. |
| 6,883,982 | B2 | 4/2005 | Tokuda et al. |
| 6,967,666 | B1 | 11/2005 | Koda |
| 7,043,528 | B2 | 5/2006 | Schmitt et al. |

(Continued)

OTHER PUBLICATIONS

U.S. Appl. No. 13/191,189, filed Jul. 26, 2011, inventors Ranganath et al.

*Primary Examiner* — Gerald Gauthier

(74) *Attorney, Agent, or Firm* — Meyertons Hood Kivlin Kowert & Goetzel, P.C.; Jeffrey C. Hood; Joel L. Stevens

(57) ABSTRACT

A videoconference may be initiated between a plurality of endpoints. At least one of the endpoints may be coupled to a recording server, which may be configured to record the videoconference. A configuration may be selected (e.g., automatically or manually) for performing the recording. The endpoint (e.g., acting as an MCU) may transmit information to endpoints and may transmit recording information to the recording server. The recording information may be different from the videoconference information. For example, it may be in a "streaming friendly" format, at a different bit rate, encoded differently, have different inputs, etc. The manner in which the videoconference is stored and/or recorded may be based on the selected configuration. Clients may be configured to receive and display the videoconference from the recording server and may be configured to change the provided layout to different layouts, e.g., based on user input.

30 Claims, 16 Drawing Sheets

(56) References Cited

U.S. PATENT DOCUMENTS 7,062,567 B2 6/2006 Benitez et al.
7,113,767 B2 * 9/2006 Vaananen .................. 455/412.1
7,133,922 B1 11/2006 She et al.
7,312,809 B2 12/2007 Bain et al.
7,362,776 B2 4/2008 Meier et al.
7,426,192 B2 * 9/2008 Amano et al. ................ 370/261
7,430,254 B1 9/2008 Anderson
7,532,231 B2 5/2009 Pepperell et al.
7,664,109 B2 2/2010 Li
7,692,683 B2 4/2010 Kenoyer et al.
7,788,380 B2 8/2010 Shim et al.
7,817,180 B2 10/2010 Jeong et al.
7,835,378 B2 11/2010 Wijnands et al.
7,945,573 B1 5/2011 Barnes et al.
7,986,637 B2 7/2011 Panwar et al.
8,023,437 B1 9/2011 Chapweske et al.
8,099,461 B2 1/2012 Matsukawa et al.
8,103,750 B2 1/2012 O'Neal et al.
8,111,913 B2 2/2012 Dunn et al.
8,116,612 B2 2/2012 Vasilevsky et al.
8,127,043 B2 2/2012 Vecchio et al.
8,139,099 B2 3/2012 Nelson
8,139,100 B2 3/2012 King et al.
8,189,030 B2 5/2012 Ivashin et al.
8,203,592 B2 6/2012 Nelson et al.
8,218,852 B2 7/2012 Cork et al.
8,228,360 B2 * 7/2012 Hamilton ................... 348/14.01
8,237,765 B2 8/2012 King et al.
8,243,119 B2 * 8/2012 Thapa ........................ 348/14.08
8,260,854 B2 * 9/2012 Cockerton .................... 709/204
8,319,814 B2 11/2012 King et al.
8,379,073 B2 2/2013 Moon
8,390,669 B2 * 3/2013 Catchpole et al. ......... 348/14.08
8,395,650 B2 3/2013 Graham et al.
8,456,507 B1 6/2013 Mallappa et al.
2004/0119814 A1 * 6/2004 Clisham et al. ............ 348/14.08
2004/0207724 A1 10/2004 Crouch et al.
2004/0230655 A1 11/2004 Li et al.
2005/0132412 A1 6/2005 Richardson et al.
2007/0285504 A1 12/2007 Hesse
2008/0084470 A1 * 4/2008 Hamilton ................... 348/14.09
2008/0316295 A1 12/2008 King et al.
2008/0316298 A1 12/2008 King et al.
2010/0042647 A1 2/2010 Schultz et al.
2010/0225736 A1 9/2010 King et al.
2010/0245560 A1 9/2010 Aldred
2011/0008022 A1 * 1/2011 Lee et al. ...................... 386/329
2011/0161834 A1 6/2011 Shadfar et al.
2011/0261142 A1 * 10/2011 Shanmukhadas et al. ... 348/14.1
2011/0261147 A1 * 10/2011 Goyal et al. ............... 348/14.08
2011/0261148 A1 * 10/2011 Goyal et al. ............... 348/14.08
2011/0261149 A1 * 10/2011 Anuar et al. ............... 348/14.08
2012/0017254 A1 1/2012 Barclay et al.
2012/0140016 A1 * 6/2012 Shanmukhadas et al. ... 348/14.1
2012/0274730 A1 * 11/2012 Shanmukhadas et al. . 348/14.08
2012/0274731 A1 * 11/2012 Shanmukhadas et al. . 348/14.08
2012/0281060 A1 11/2012 Swanson et al.
2013/0027509 A1 1/2013 Ranganath et al.
2013/0070045 A1 3/2013 Meek
2013/0155179 A1 6/2013 Corley et al.
2013/0162755 A1 * 6/2013 Swanson et al. ........... 348/14.08
2013/0191287 A1 7/2013 Gainer et al.
2013/0222523 A1 * 8/2013 Shanmukhadas et al. . 348/14.08
2013/0222524 A1 * 8/2013 Shanmukhadas et al. . 348/14.08
2013/0222530 A1 * 8/2013 Shanmukhadas et al. . 348/14.13
2013/0223811 A1 * 8/2013 Shanmukhadas et al. .... 386/224
2013/0278708 A1 10/2013 Mock

* cited by examiner

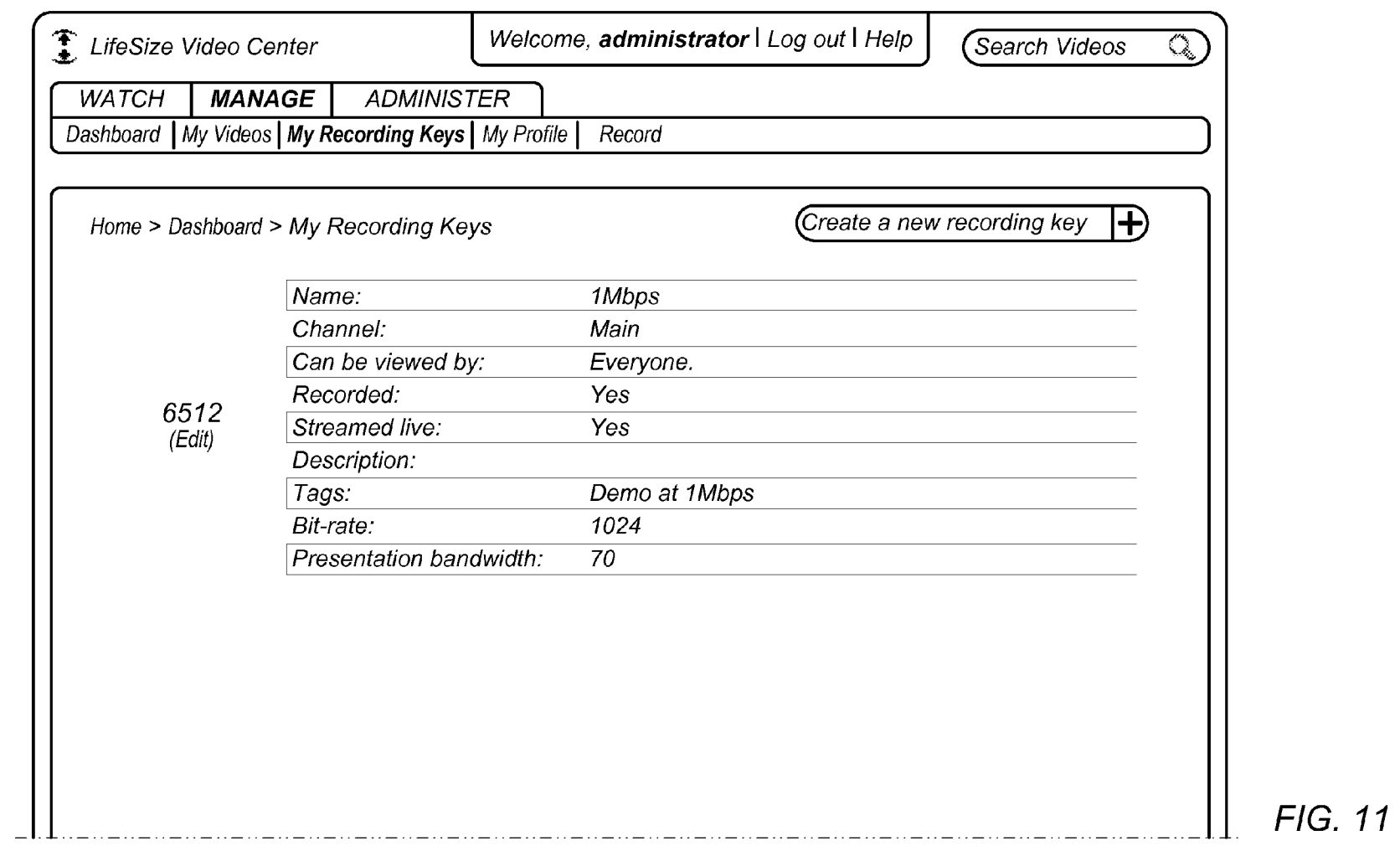

LifeSize Video Center

Welcome, administrator | Log out | Help

Search Videos

WATCH | MANAGE | ADMINISTER

Dashboard | My Videos | My Recording Keys | My Profile | Record

Home > Dashboard > My Recording Keys

Create a new recording key 6512
(Edit)

| | |
|---|---|
| Name: | 1Mbps |
| Channel: | Main |
| Can be viewed by: | Everyone. |
| Recorded: | Yes |
| Streamed live: | Yes |
| Description: | |
| Tags: | Demo at 1Mbps |
| Bit-rate: | 1024 |
| Presentation bandwidth: | 70 |

FIG. 11

COLLABORATIVE RECORDING OF A VIDEOCONFERENCE USING A RECORDING SERVER

FIELD OF THE INVENTION

The present invention relates generally to conferencing and, more specifically, to recording a videoconference.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s). Each videoconferencing system may also be coupled to a computer system to allow additional functionality into the videoconference. For example, additional functionality may include data conferencing (including displaying and/or modifying a document for both participants during the conference).

Present videoconferencing systems allow for some recording ability. However, to achieve such recording, a new recording endpoint must be added, which takes up valuable screen space for participants. Additionally, the recorded material typically includes a recording of itself (e.g., as blank space). Also, the information received by the recorder is not suitable for streaming to other users, but rather requires transcoding. Accordingly, improvements in videoconferencing recording are desired.

SUMMARY OF THE INVENTION

Various embodiments are presented of a system and method for recording a videoconference.

A videoconference may be initiated between a plurality of endpoints. At least one of the endpoints may be coupled to a recording server, which may be configured to record the videoconference.

A request may be received to record the videoconference. For example, a user may provide a single user interaction to initiate or perform the recording of the videoconference. In one embodiment, the user may simply select a record button, e.g., on a remote, and the recording may be initiated. Alternatively, the recording of the videoconference may be initiated automatically, or may involve more than a single user interaction, as desired. In some embodiments, the request may be received by the recording server, e.g., as a message from an MCU of the videoconference or an endpoint of the videoconference.

One or more recording configurations may be selected (e.g., automatically or manually) for performing the recording. The manner in which the videoconference is recorded (e.g., and how it is stored and published by the recording server) may be based on the selected recording configuration (s). Additionally, the recording configurations may determine the manner in which videoconference information is provided to the recording server.

The endpoint (e.g., acting as an MCU) may transmit information to endpoints and may transmit information to the recording server for recording. Alternatively, a different endpoint or videoconference device may be determined that has a high quality connection to the recording server. For example, the endpoint (or other type of device) that has the best connection to the recording server may be used to provide the recording information to the recording server (e.g., in order to achieve a high quality recording of the videoconference).

The recording information transmitted to the recording server may be different from the information transmitted to the other endpoints. For example, the recording information may be in a "streaming friendly" format, at a different bit rate, encoded differently, have different inputs or video content, etc. The format of the recording information may be affected by the selected recording configurations. For example, the format of the recording information may correspond to a specified format of one of the recording configurations.

The recording information may include participant videoconference information and auxiliary videoconference information (e.g., corresponding to a presentation presented in the videoconference). The participant videoconference information and the auxiliary videoconference information may be provided together or separately (e.g., as separate streams) to the recording server, as desired.

In some embodiments, a timeline may be provided or generated which specifies when the auxiliary videoconference information was present in the videoconference (e.g., when a presentation is only given for a portion of the videoconference). The recording information may specify boundary information of a composite image provided to the recording server. For example, the boundary information may specify the boundary of each portion in the composite image.

In some embodiments, the transcoding or recording work may be distributed among a plurality of recording resources. For example, a second endpoint may provide second recording information to the recording server that has a different format than the recording information described above. In one embodiment, the second endpoint may use videoconference information of the videoconference to generate the second recording information, or may transcode the recording information described above, as desired. In various embodiments, other devices may perform recording or transcoding work, e.g., when the recording server lacks the capacity to record the videoconferences in all of the desired formats (e.g., as specified by the recording configurations selected above). Thus, recording work may be distributed among a plurality of devices, e.g., including endpoints participating in the videoconference, as desired.

Clients of the recording server may be configured to receive and display the recorded videoconference. For example, the client may be configured to display the participant videoconference information and the auxiliary videoconference information using a timeline provided by the recording server. Additionally, or alternatively, the client may be configured to change the provided layout of the recording to different layouts, e.g., based on user input. For example, boundary information may be provided from the recording server to the client to allow the client to change the layout of the playback of the recording of the videoconference.

BRIEF DESCRIPTION OF THE DRAWINGS

A better understanding of the present invention may be obtained when the following detailed description is considered in conjunction with the following drawings, in which:

FIGS. 1 and 2 illustrate exemplary videoconferencing system participant locations, according to an embodiment;

FIG. 11 is a screen shot of an interface for editing and creating configurations, according to one embodiment;

Figure 1:
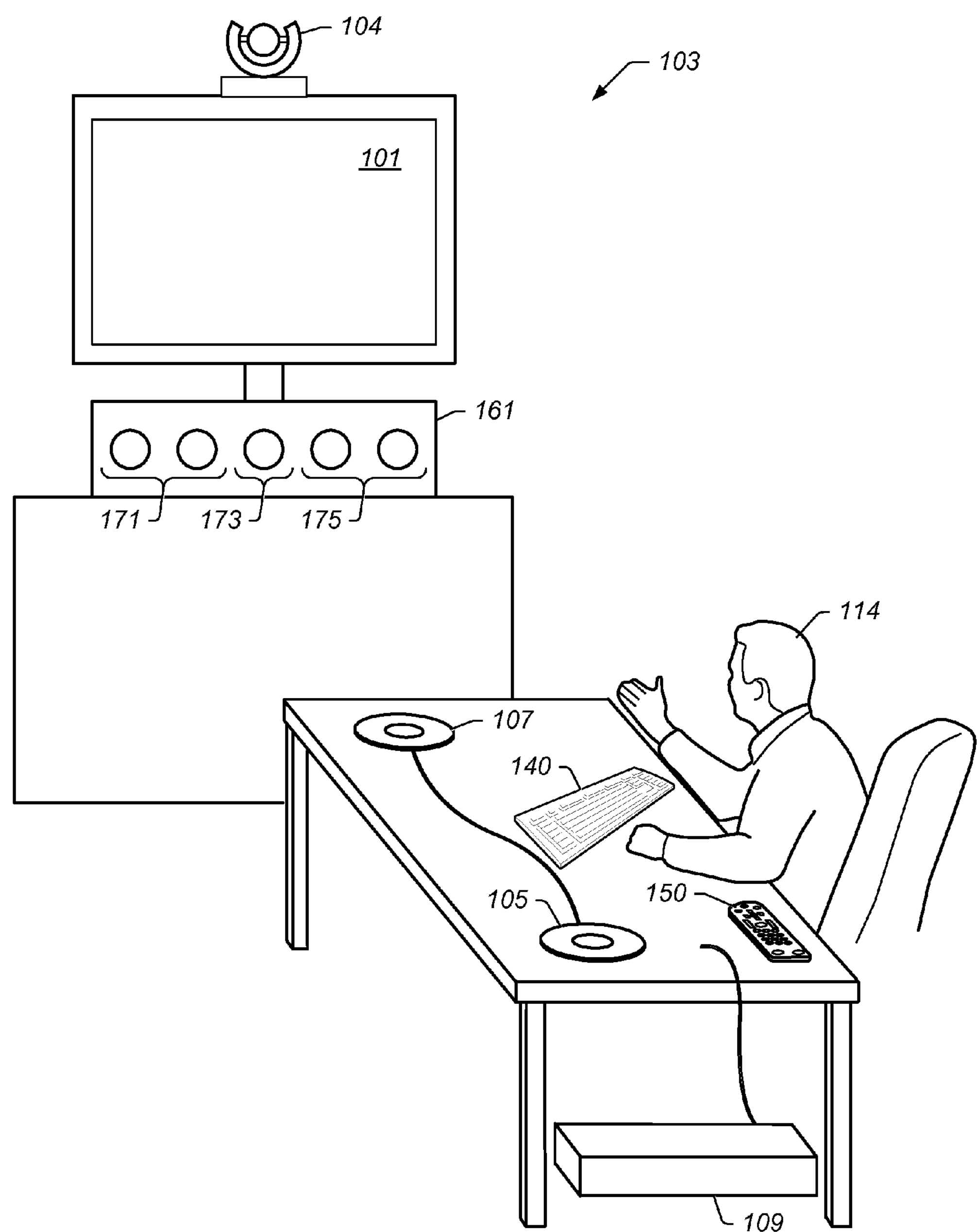

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, whose inventors are Keith C. King and Wayne E. Mock, is hereby incorporated by reference in its entirety as though fully and completely set forth herein.

U.S. patent application titled "Virtual Multiway Scaler Compensation", Ser. No. 12/171,358, whose inventors are Keith C. King and Wayne E. Mock, is hereby incorporated by reference in its entirety as though fully and completely set forth herein.

U.S. patent application titled "Virtual Distributed Multipoint Control Unit", Ser. No. 12/712,947, whose inventors are Keith C. King, Ashish Goyal, and Hrishikesh Gopal Kulkarni, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Figure 2:
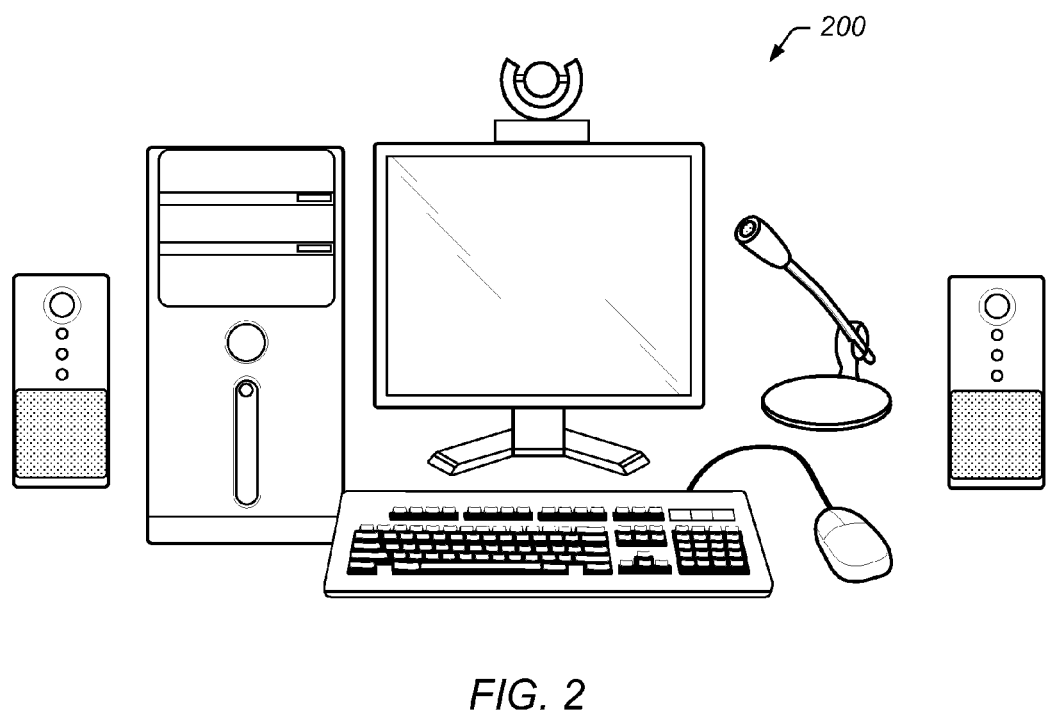

FIGS. 1 and 2—Exemplary Participant Locations

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints)

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference. The GUI may also present options for recording a current videoconference, and may also present options for viewing a previously recorded videoconference.

Note that the videoconferencing system shown in FIGS. 1 and 2 may be modified to be an audioconferencing system. For example, the audioconference could be performed over a network, e.g., the Internet, using VoIP. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

Figure 3A:
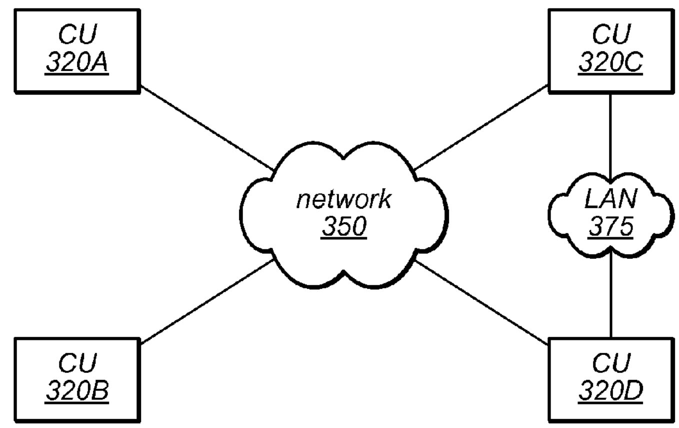
FIGS. 3A and 3B illustrate exemplary conferencing systems coupled in different configurations, according to some embodiments.
Figure 3B:
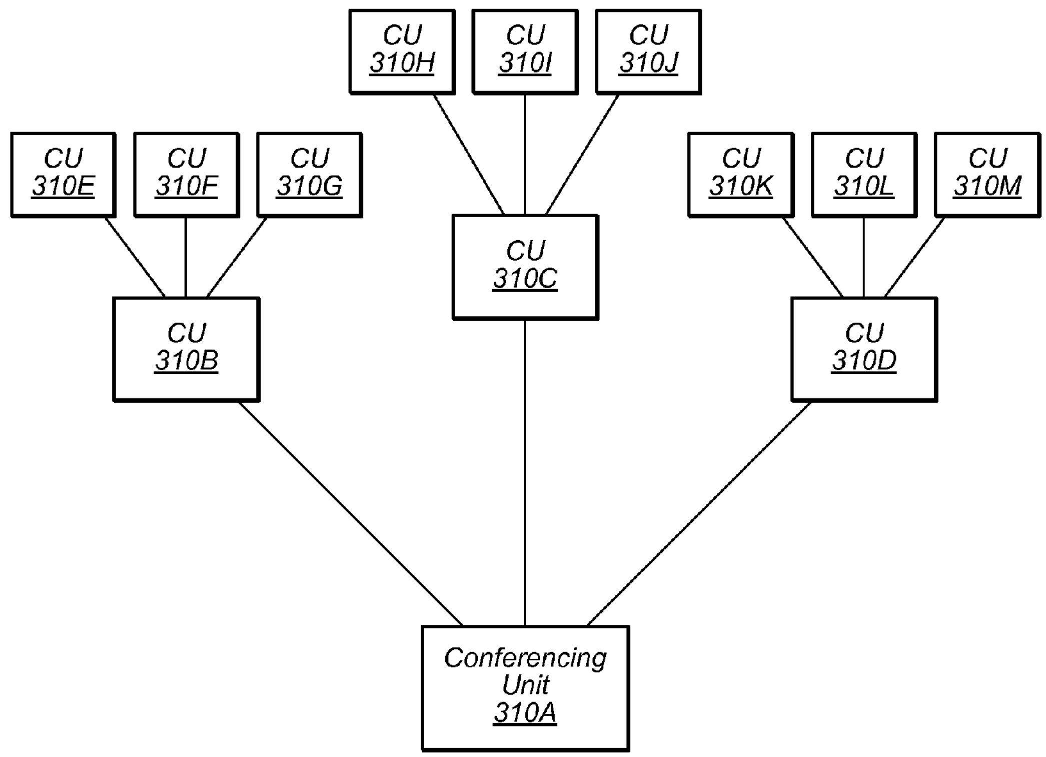

FIGS. 3A and 3B—Coupled Conferencing systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
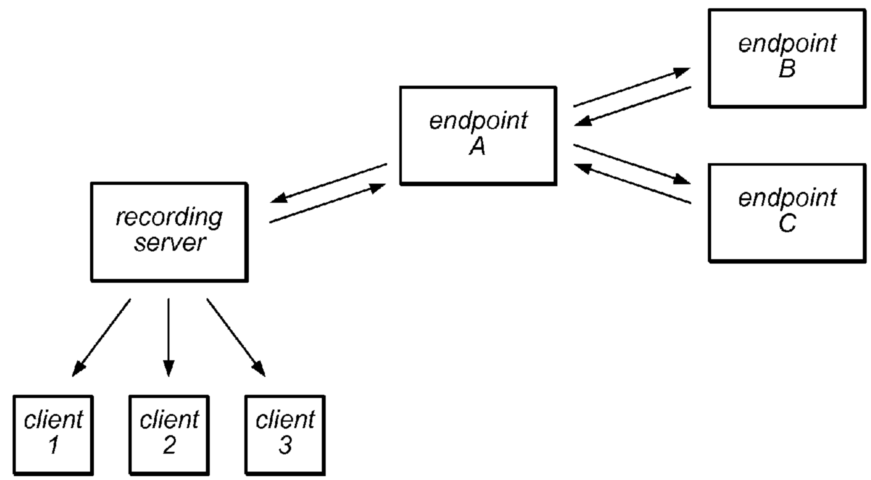
FIG. 4 is a block diagram illustrating endpoints in a videoconference, a recording server, and clients, according to one embodiment.

FIG. 4—Videoconferencing System Block Diagram Including Recording Server

FIG. 4 is a block diagram of a videoconferencing system that includes a recording server. As shown, there may be a plurality of videoconferencing endpoints in a videoconference. The videoconference may be performed in the manner described in U.S. patent application Ser. No. 11/252,238, incorporated by reference above, although other configurations are envisioned. As shown in FIG. 4, videoconferencing endpoint A may act as a host or MCU of the videoconference for videoconferencing endpoints B and C. The videoconferencing endpoints A, B, and C may be similar to those described above with respect to FIGS. 1 and 2, although other variations are envisioned. As shown, videoconferencing endpoint A may communicate with both endpoints B and C in a bidirectional manner. For example, endpoint B may provide audio and video generated at the location of B and endpoint C may provide audio and video generated at the location of C. Accordingly, endpoint A may provide videoconferencing information back to B and C, respectively, for presentation to participants at those locations. For example, A may provide a composite image of itself and C to B and a composite image of itself and B to C. However, A may simply provide a composite image of A, B, and C, and each endpoint may present whatever layout they desire (e.g., based on user input), similar to embodiments described below.

In some embodiments, presentation (e.g., Powerpoint®, digital documents, web pages, videos, projections (e.g., of physical documents), scanned documents, etc.) video and/or audio may also be provided. For example, C may provide presentation information to A as well as video from a video input at location C. In some embodiments, the presentation information may be provided separately from the video of the location (e.g., over a different channel or stream), although the video could be combined, e.g., in a composite image. In turn, A may provide the video and/or presentation information, and possibly its own video, to B.

Note that endpoint A, when providing composite images, may also provide information indicating how the composite image is formed, such that the other endpoints can divide and reform new composite images or screen layouts based on the received composite image. For example, A may indicate that the transmitted video from A to B includes four quadrants, a quadrant for A, a quadrant for C's location video, a quadrant for C's presentation, and another quadrant, which could include any number of video sources, e.g., auxiliary video (from a computer, DVD player, etc.), video from B, or from another video camera, e.g., at location A. In the embodiment shown in FIG. 5A, each endpoint also receives and (possibly) displays its own video, although other embodiments are envisioned where this is not the case. Note that the composite images supplied to each endpoint may be the same or different, as desired.

By providing an indication of the layout and information provided in each window of the layout, each receiving endpoint may be configured to change the layout of the composite image, e.g., based on user input. The layout change may be performed "live" or "on demand", e.g., in response to a user requesting the layout change. Additionally, the layout changing may be performed as described in various ones of the patent applications incorporated by reference above. Thus, the user may be able to only display a single video source, or emphasize one of the sources over other ones (e.g., where the active speaker is shown larger than the other video sources). For example, as shown in FIG. 5B, the participants may be able to change the layout of the display based on the composite images provided in FIG. 5A without requiring the MCU to provide new images. More specifically, in FIG. 5B, the participant at A has chosen to view the presentation in a larger screen, with A, B, and C video in smaller screens; the participant at B has chosen to view C in the main screen and just A and the presentation in smaller screens; and the participant at C has chosen just to see A and B with equal shares of the screen. Thus, each endpoint may be configured to present different layouts using the layout information sent by the host, e.g., without requiring the host to send new or different composite images.

Note that while various embodiments described above refer to layout changes in response to user input, the layout changes may be performed automatically, without user input requesting the layout change. For example, the videoconferencing endpoint may automatically change the videoconference layout at a particular location in response to the addition of a presentation, the removal of a presentation, the addition of a new participant, the removal of a new participant, the amount of talking that is performed by each participant, etc. Thus, the videoconference layout may be modified automatically or in response to user input, as desired.

Thus, as shown in FIG. 4, a videoconference may be performed between endpoints A, B, and C. As also shown, one of the endpoints of the videoconference (e.g., the host or MCU A) may be coupled to a recording or streaming server, e.g., via a network, such as the Internet, although in some embodiments, the recording server may be on a network that is local to the endpoint. In another embodiment, the recording server may be implemented as part of the MCU or one of the participating endpoints, e.g., the MCU may be implemented as a multi-processor system whereby one or more processors are used for MCU functionality and one or more processors are used for implementing the recording server. The recording server may be any type of computer server, as desired. In some embodiments, the MCU may provide video and audio of the videoconference to the recording server for recording.

Note that the audio and video provided to the recording server may be independent from any other streams being sent to the other endpoints. For example, the audio and video provided to the recording server may include every endpoint's audio and video (either combined or separately, as desired), whereas videoconference streams sent to each endpoint during the actual videoconference may not typically include its own video (e.g., B may not receive its own video). Thus, in some embodiments the recording server may receive video and audio from of all of the participants, even though during the videoconference various ones (or all) of the participants may receive video and audio from only a subset of the participants, although in other embodiments, this may not be the case. However, in other embodiments, the videoconference information sent for recording may exclude one or more video sources, e.g., in response to user input excluding them (or inversely, not including them) from being recorded.

Additionally, the videoconference information sent for recording may be at a different bit rate, encoding format, resolution, frame rate, or any other variable than the information provided to the other videoconferencing endpoints, as desired. For example, in some embodiments, the videoconference information sent from the MCU to the recording server may already be streaming friendly. For example, the MCU may provide the videoconference information to the recording server in a format that includes I frames (intra frames) or other information that allows clients to self correct the video (e.g., in the event of lost packets or an interruption). In one embodiment, the videoconference information may be provided in a container format that is used by streaming players (flv, swf, wmv, mov, mp4, etc) and/or may be encoded using the audio/video codecs that is supported by streaming players. Thus, in some embodiments, the recording server may not be required to transcode the videoconference before streaming it to clients. However, in further embodiments, the recording server may be able to transcode the received videoconference into a plurality of formats, e.g., in order to provide the videoconference to various types of devices, e.g., which cannot support the original format. Alternatively or additionally, the MCU may provide a plurality of differently coded recordings corresponding to the videoconference, e.g., to support heterogeneous clients. Thus, the information sent to the recording server may be independent or unique from any of the other videoconferencing information sent from the MCU to the other endpoints during the videoconference. Additionally, unlike some prior art solutions, where the recording server joins the videoconference as a participant, the information sent to the recording server may not include audio/video corresponding to the recording server (e.g., where a portion of the videoconference information sent to the recording server includes a blank portion corresponding to the recording server as a participant). Said another way, the recording server may not use a port of the MCU and thus may not be considered a "participant" to the videoconference. Accordingly, the recording server may not receive any video or composite section that corresponds to the recording server.

As also shown, the recording or streaming server may be coupled to one or more clients. In FIG. 4, the recording server is coupled to client 1, client 2, and client 3. The clients may be any type of client as desired. For example, the client may be a typical computer system such as a desktop or laptop computer system, a netbook, a tablet, a mobile device, such as a phone, etc. Generally, a client may be any type of device that is capable of displaying video files or streams to a user. According to embodiments, described herein, the recording server may stream the videoconference to the clients, e.g., during the videoconference or after, as desired. Similar to embodiments described above, the streams provided to the clients may include multiple video streams (e.g., for each participant, presentation, etc.) and at least a portion of the video streams may be packaged in composite video (composite video here refers to a video stream that itself contains video from two or more endpoints and hence is a composite of the video from those endpoints, where the composite video is comprises a plurality of composite images). Also similar to above, the recording server may provide the video streams to clients with information indicating the layout of the composite video, thereby allowing the client to change the layout of the displayed videoconference during playback.

Note that while the recording server is shown as coupled to only endpoint A, the recording server may be coupled to all or any subset of the endpoints of the videoconference, as desired. In some embodiments, it may be especially desirable that the recording server is coupled to and receives videoconference information from an endpoint with a high quality connection to the recording server, e.g., over a local area network instead of the Internet or having the highest quality Internet connection between the endpoint and the recording server.

Further details regarding the videoconference and recording server are provided below.

Figure 6:
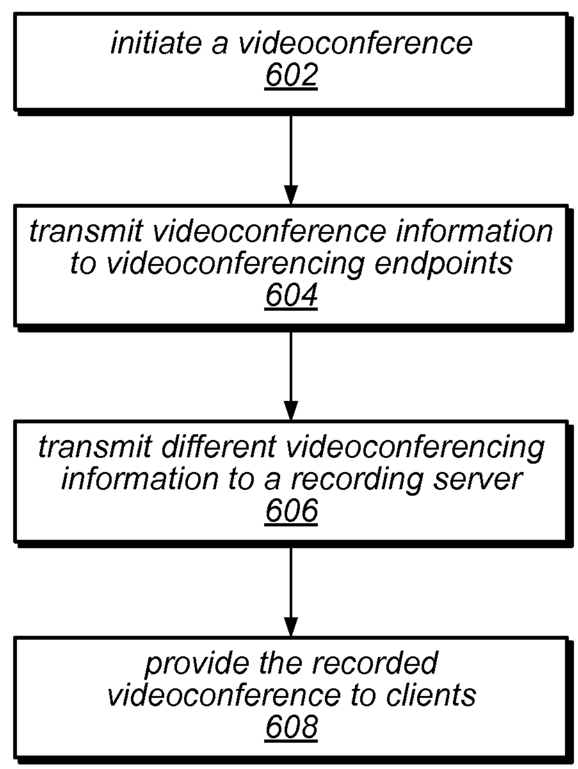
FIG. 6 is a flowchart diagram illustrating an embodiment of a method for recording a videoconference.

FIG. 6—Recording a Videoconference Using a Recording Server

FIG. 6 illustrates a method for recording a videoconference using a recording server. The method shown in FIG. 6 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, a videoconference may be initiated or performed between a plurality of participants at respective participant locations. More specifically, the conference may be initiated between a first participant using a first endpoint (e.g., at a first participant location) and a plurality of other participants using other endpoints (e.g., at other participant locations). Thus, endpoints may be similar to those described above regarding FIGS. 1-4, although other variations are envisioned. The videoconference may be established according to any of a variety of methods, e.g., the one described in patent application Ser. No. 11/252,238, which was incorporated by reference above. The videoconference may utilize an instant messaging service or videoconferencing service over the Internet, as desired.

In some embodiments, a multipoint control unit (MCU) may perform the first videoconference between the plurality of videoconference endpoints. For example, one of the endpoints (e.g., the first endpoint) may act as the MCU and may perform decoding and encoding operations on video information transmitted in the first videoconference between the plurality of videoconferencing endpoints. Alternatively, the MCU may be a separate videoconference device that performs the videoconference, e.g., it may not be incorporated in an endpoint of the videoconference. However, it should be noted that endpoints other than the MCU are still considered as "performing" the videoconference.

In 604, the MCU may transmit videoconference information (e.g., including video and audio) to the videoconferencing endpoints during the videoconference, for presentation to corresponding participants. Thus, in 604 the MCU may receive videoconference information from various endpoints and also transmit videoconference information to the various endpoints.

In 606, an endpoint of the videoconference (e.g., the MCU) may transmit videoconference information for recording the videoconference to a recording or streaming server during the videoconference, e.g., concurrently with the transmission of the videoconference information sent to the videoconferencing endpoints in 604. The endpoint may begin transmitting the videoconference information for recording in response to user input, e.g., before or during the videoconference. For example, one of the participants in the videoconference may request that all or a portion of the videoconference be recorded. In one embodiment, the participant may be able to simply select a "record" button, e.g., on a remote, and may not have to provide any further input, e.g., using preset configurations. Further embodiments regarding recording configurations and pins are provided below with respect to FIG. 10.

In one embodiment, participants in a videoconference may be able to select an option which prevents their respective video/audio stream from being recorded. When this option is selected by a respective participant, that participant's audio/video is not transmitted to the recording server for recording. Alternatively, or additionally, one of the participants (e.g., a controlling user) may be able to select which video streams of the videoconference should be recorded, e.g., using a GUI of the participant's respective endpoints, or via other means, as desired. In further embodiments, the videoconference streams that are recorded may be selected automatically without receiving user input to select the streams to be recorded. For example, the selection may be made by the recording server and/or an endpoint, e.g., recording only the most active talkers, the most important talkers, etc.

As indicated above, the videoconference information sent to the recording server may be independent or unique from the videoconference information sent to the videoconferencing endpoints. More particularly, the videoconference information sent to the recording server may be "streaming friendly", i.e., the videoconference information may be provided in a format that can be streamed from the recording server to clients with little or no modification. For example, the videoconference information sent to the recording server may include periodic I frames (iframes), as opposed to the normal videoconference streams, which may include only an initial iframe, iframes based on a request from an endpoint (e.g., if the endpoint needs to recover video), and/or no iframes. Normal videoconference streams may not require these iframes since each endpoint may be configured to request a new iframe as necessary, which may not be supported by the recording/streaming server. However, embodiments where one or more of the endpoints also include periodic iframes are also envisioned (although they may not be at the same rate or periodicity as those provided to the recording server).

By including the periodic iframes, a client of the recording server may recover from lost packets or other transmission issues without having to rerequest information from the recording server. Additionally, the client may be able to seek different portions of the videoconference, e.g., based on user input selecting, for example, a position before or after the current position of playback of the videoconference. In other words, the recording server may provide the videoconference in a streaming format, e.g., which is different from that provided to the videoconferencing endpoints in the videoconference. Additionally, or alternatively, the videoconference information sent to the recording server may be sent in a streaming format (e.g., H.264, Flash™, wmv, etc.) or may otherwise be wrapped in a streaming container. In some embodiments, the MCU may automatically download or select advanced properties like bitrate, resolution, codecs, container formats from the streaming/recording server and use that for generating the videoconferencing information to be sent to the recording server.

The videoconference information transmitted to the recording server may be sent in any of a plurality of ways. For example, each video and/or audio stream (e.g., from each participant) may be transmitted separately to the recording server by the endpoint (e.g., the MCU). Alternatively, one or more video and/or audio streams may be composite, e.g., may be provided as a composite video images to the recording server. When composited images are sent to the recording server, the endpoint may indicate the boundaries of the composite video image so that the layout may be changed at a later point, e.g., by streaming clients. As used herein, a "composite video stream" may refer to a video stream that comprises a plurality of images that are a composite of multiple images, which when played sequentially form a video stream of the composite images. The boundary information of the composite image or composite video stream may indicate the borders of individual images within each composite image.

In some embodiments, any combination of the separate and composite transmission may be used. For example, presentation information may be sent separately from the participant video, which may be a composite of images of all the participants. Alternatively, or additionally, the recording server may receive and/or store main and auxiliary video streams separately. The audio information may be separated and associated with a particular video stream (or portion of a composite image) or may simply be mixed together as a single audio for the recorded videoconference. In one embodiment, in a point to point call setup, the information sent to the recording server may comprise only the local video source and the far end video source and corresponding audio.

In some embodiments, while receiving or storing content which is composed of multiple video streams composited together (e.g., by a compositor), the recording server may request or simply receive composition information from the compositor and store it with the recorded stream. As indicated above, the composition information may define the boundaries of the source images in the composite image. The composition information may change with time as new participants join the call, existing participants leave, presentations are added, auxiliary inputs are added, etc. In one embodiment, the composition information may be stored against the timeline of the video. In further embodiments, the timeline may be used for indicating when secondary streams of information are present during the videoconference. For example, where a presentation is provided for a period of time during the videoconference (but not all of the videoconference) the timeline may indicate when the presentation occurred. This may be particularly useful when the presentation information is stored separately (and/or is provided separately) to the recording server. Accordingly, the recording server will know when to provide the presentation information in 608 below, e.g., by using the timeline.

Thus, in 606 the recording server receives the stream(s) from a videoconference device (e.g., an endpoint or MCU) and may record (or store) the stream(s) in the memory of the recording server.

In 608, the recording server may provide the recorded videoconference information to one or more clients, such as shown in FIG. 4. According to various embodiments, the recording server may provide the videoconference information concurrent to (at the same time as) the videoconference (e.g., broadcast live or with some delay). Additionally, or alternatively, the recording server may provide the videoconference information after the videoconference is recorded or complete. For example, the recording server may store a repository of videoconferences which may be viewed by clients, e.g., via the Internet, e.g., using a web site. In some embodiments, the clients may view the videoconference at any point during or after the videoconference, according to their desire.

When transmitting to clients, the recording server can send the composition or boundary information (e.g., with a timeline) to the client. Note that the boundary information may be included in the video information (e.g., as metadata) or separately, as desired. Accordingly, the client's player may be configured to use the boundary information to modify the composite video stream in a variety of ways. For example, the client may be configured to allow the user to zoom in to a specific section (specific participant) of the videoconference.

Figure 5A:
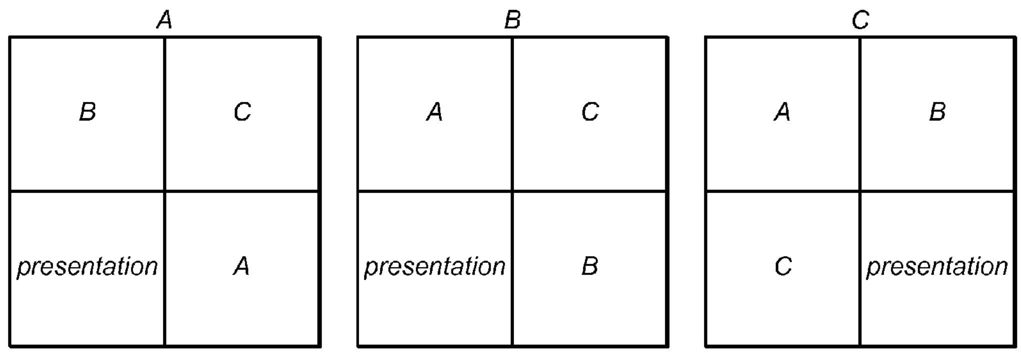
FIGS. 5A and 5B illustrate exemplary screen layouts for a videoconference, according to one embodiment.
Figure 5B:
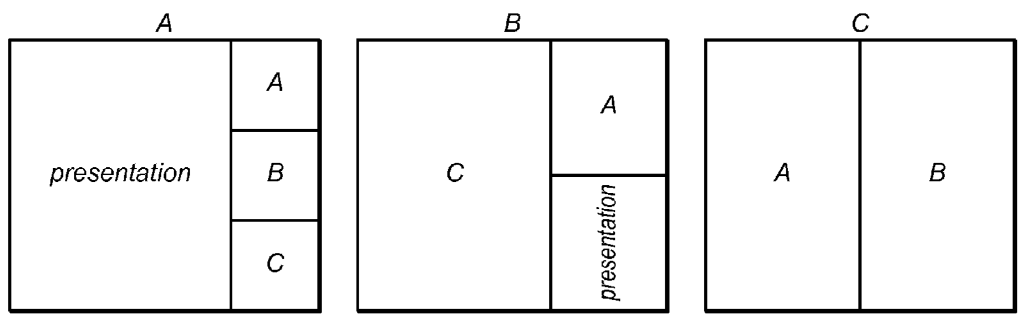

The client may also be allowed to move the video sections around and display them in layouts that differ from the original composited video (e.g., similar to the modifications shown in FIG. 5B from FIG. 5A, among other possibilities). In one embodiment, this may be achieved using multiple video players with each player zooming in to a separate section of the video. The players may then be scaled and if required overlaid on to achieve layouts like picture in picture.

Figure 7A:
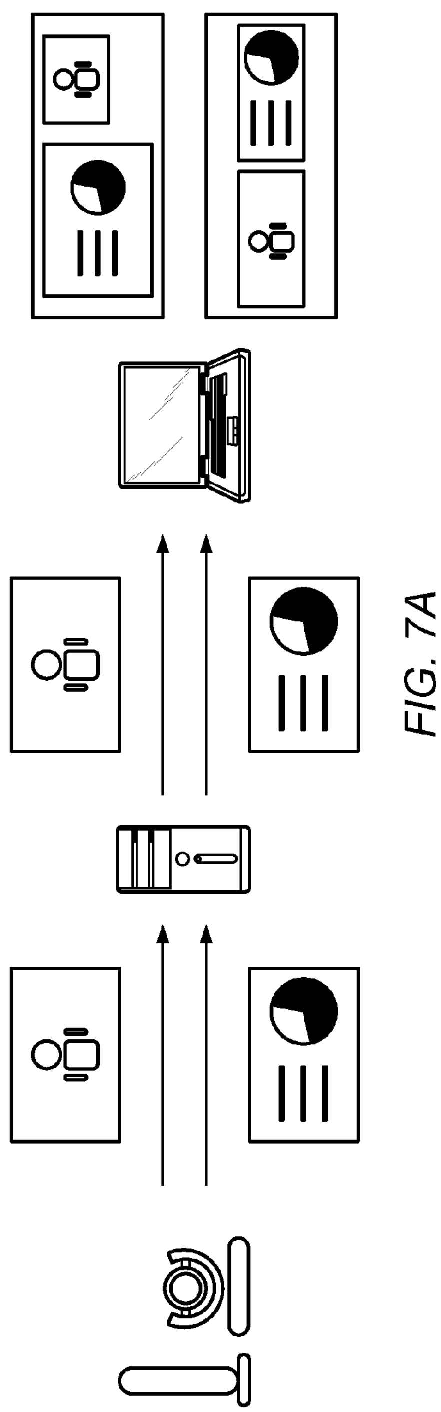
FIGS. 7A-8B are diagrams illustrating flow of data between endpoints, recording servers, and clients, according to some embodiments.
Figure 7B:
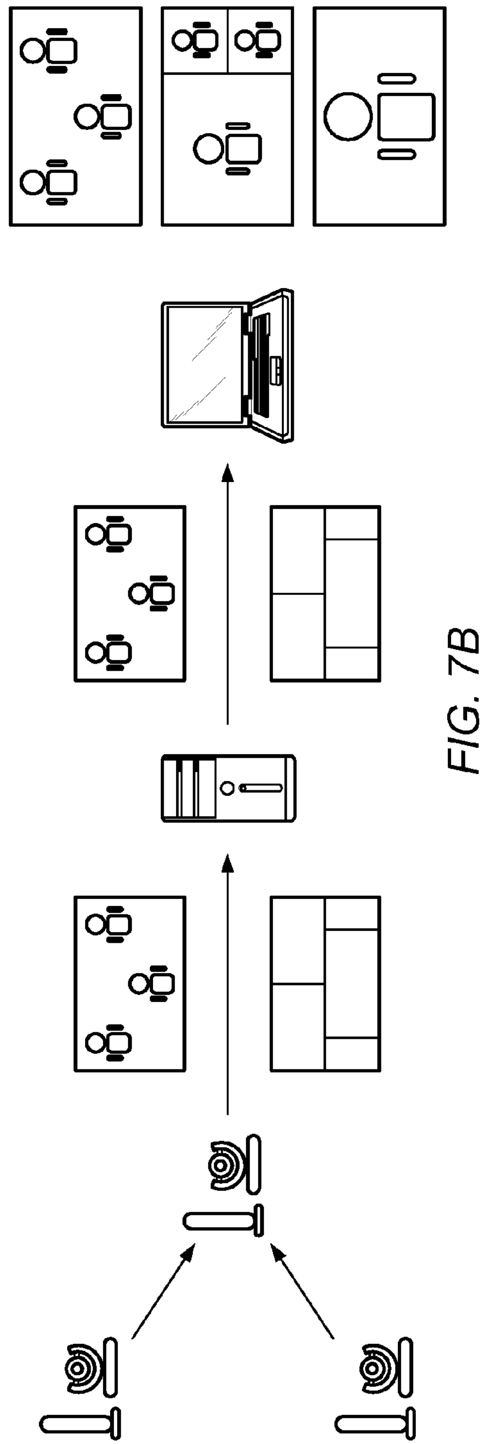
Figure 7C:
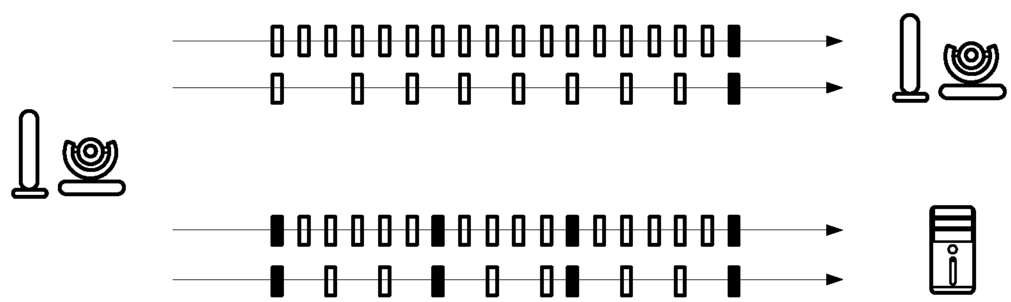

FIGS. 7A-7C illustrate diagrams showing the transmission of information from an MCU or endpoint to the recording server to a client (although there may be a plurality of clients). In the embodiment of FIG. 7A, the endpoint transmits separate video streams to the recording or streaming server. In this example, the video streams include a participant video stream and a presentation video stream. Note that the embodiment shown may apply to a videoconference (including a plurality of participants) or may also apply to a single participant presenting a presentation, e.g., for broadcast via the recording server. As shown in FIG. 7A, the streaming server may send the two video streams separately to the client, which may in turn display the two video streams in any of various manners, e.g., according to the user's desire. For example, as shown, the user may view both streams equally or the presentation in a larger format. Further layouts are envisioned, e.g., where only one or the other video is displayed.

FIG. 7B illustrates a diagram showing transmission of information from an MCU or endpoint to the recording server to a client. In this embodiment, the MCU receives videoconference information from other endpoints and composites the video with multiple participant images. The MCU sends this composite video as well as boundary information identifying the composite sections to the recording server. The recording server in turn provides this information to the client, which is able to view the videoconference in the original layout, or any of various other layouts (e.g., displaying only a single participant or emphasizing one of the participants by showing that participant as a larger portion of the display, although other layouts are envisioned). In the embodiment of FIG. 7B, the endpoint and/or recording server may be configured to transmit auxiliary streams as well (e.g., video streams corresponding to a presentation), either in the composite video stream or separately, as desired.

FIG. 7C illustrates the transmission of two streams from the MCU or endpoint to another endpoint and the transmission of two streams from the MCU to the recording server. Thus, in the embodiment of FIG. 7C, the MCU is able to send a plurality of different streams to endpoints as well as to the recording server. Note that, in this embodiment, the recording server streams include periodic iframes. Thus, FIGS. 7A-7C illustrate the transmission of data to the client via the recording server, allowing users to change the layout of the recorded videoconference.

Figure 8A:
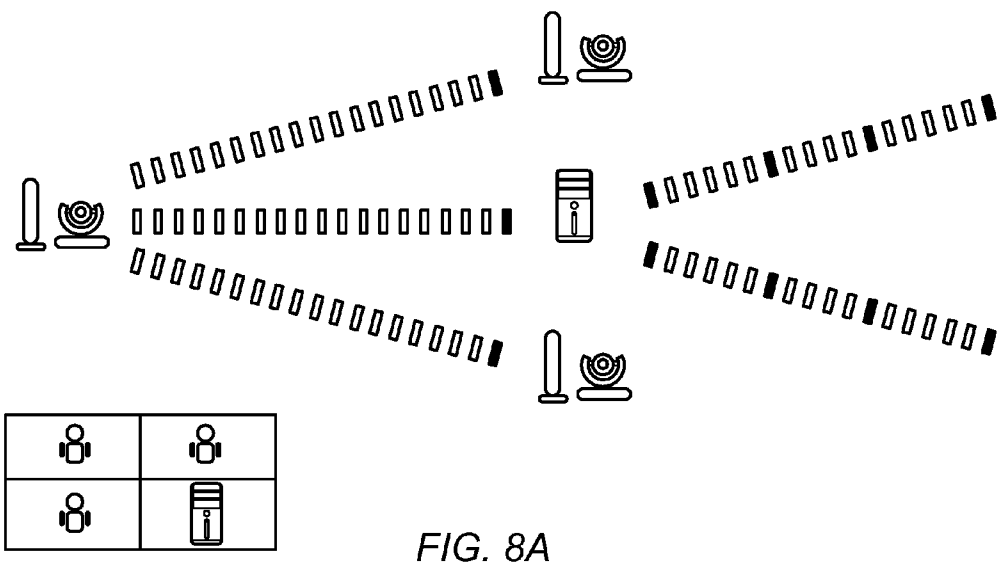
Figure 8B:
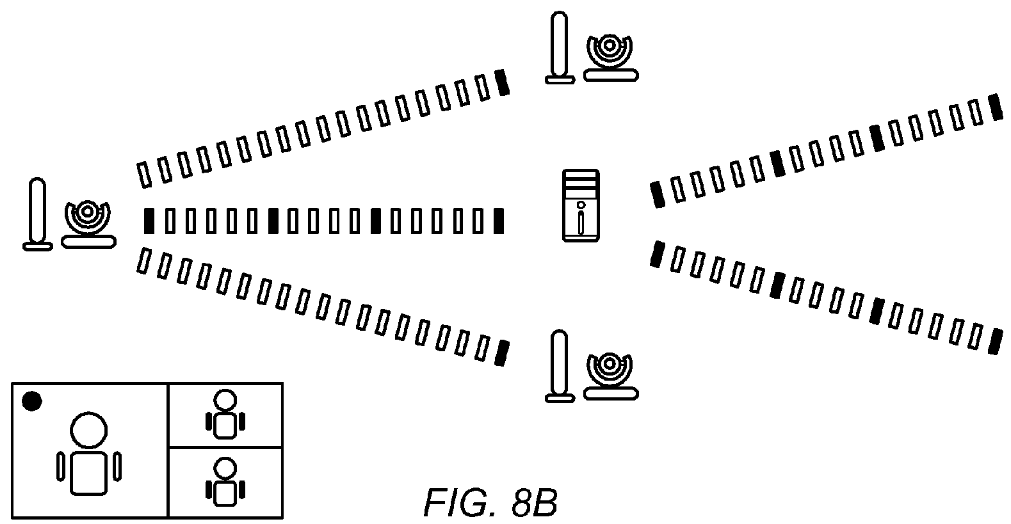

FIGS. 8A and 8B illustrates two comparative embodiments showing the transmission of data. In FIG. 8A, a recording method is shown where the recorder is a participant in the videoconference. In this embodiment, the videoconference information provided to the recording server is not unique or different from the other two videoconferencing endpoints. Additionally, the screen layout includes the recorder, which takes up a portion of the screen for the participants (and is also recorded). The recording server then transcodes the videoconference for provision to clients to include periodic key (e.g., I) frames, which as indicated above are able to cope with losses in transmissions. Additionally, the key frames allow for seeking (e.g., allows the user to skip over portions of the videoconference when viewing) and allows new viewers join a session at any time (although new sessions could be formed at any time otherwise). In this embodiment, the transcoding process performed by the recording server results in a lower number of possible streaming clients at any one time. This embodiment also reduces the number of recording sessions that the recording server can perform at any one time.

A more preferred embodiment is shown in FIG. 8B. In FIG. 8B, the layout provided to both the other endpoints and the recording server does not include the recording server as a participant. Accordingly, the screen layout is not reduced by having to show the recording server. Additionally, participants of the videoconference may be aware that recording is occurring by a recording indication in the layout (shown in the upper left hand corner). In some embodiments, this recording indication may only be displayed to the participants, but may not be sent to the recording server. As also shown, the MCU may transmit the videoconference information to the recording server differently than that to the videoconference endpoints, in this case including the periodic iframes. The recording stream may be unique in other manners, as indicated above. The recording server can then rebroadcast the source stream without transcoding it and can therefore support a larger number of concurrent recording and streaming sessions.

Figure 9:
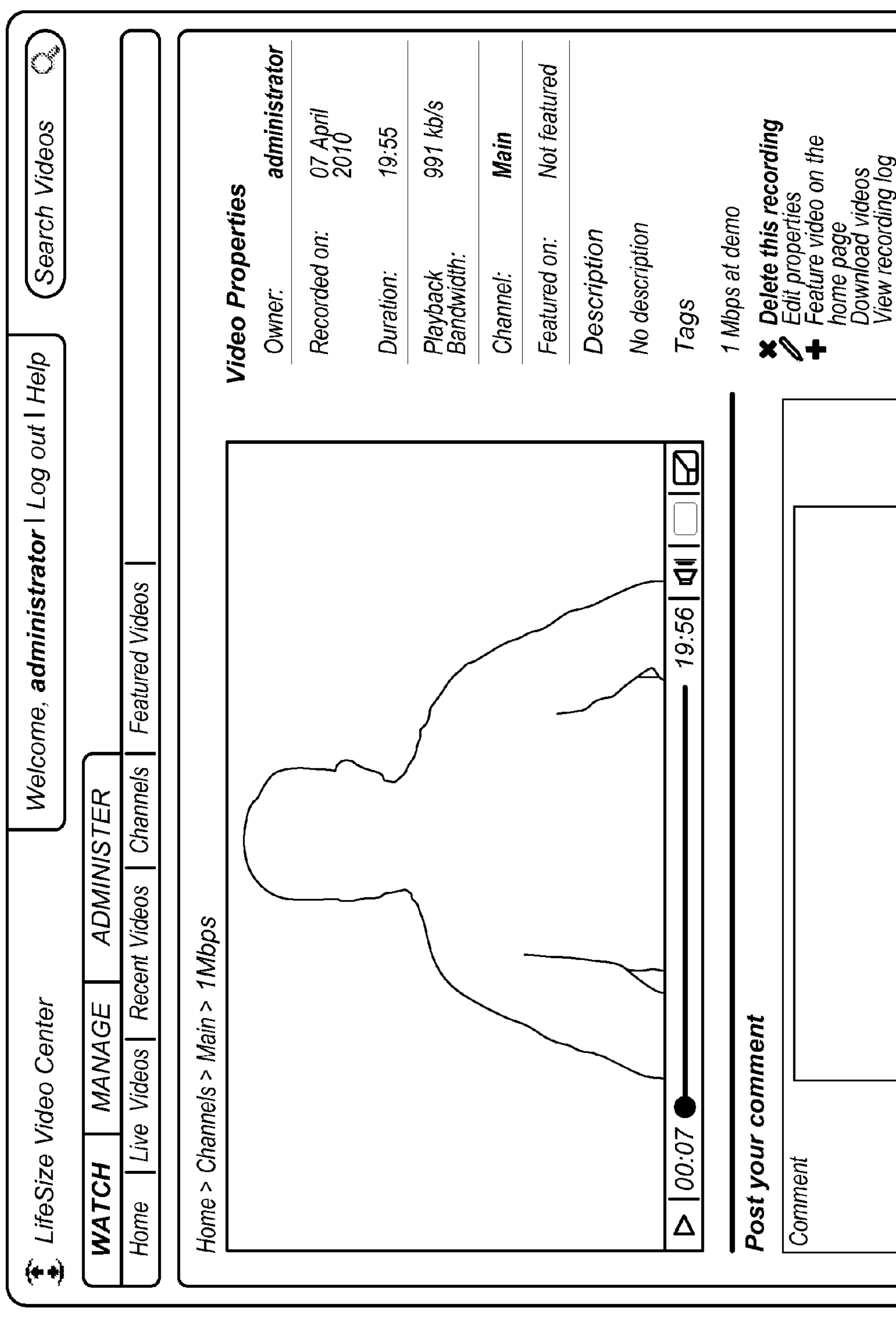
FIG. 9 is a screen shot illustrating an interface for viewing a recorded videoconference, according to one embodiment.

FIG. 9 illustrates an exemplary interface (e.g., on a web page) for viewing a recorded videoconference. As shown, the user may be able to view the recorded videoconference, seek any point in the videoconference, adjust volume, screen size, etc. Additionally, the interface may indicate metadata of the videoconference, including, for example, the owner or creator, the record date, the duration, the playback bandwidth, the channel, any tags, etc. Additionally, the owner may be able to edit this information, delete the recording, feature the video, download the video, view the recording log, etc. Further viewers may be able to post comments about the video or browse to view other videos (e.g., looking at other channels, recent videos, featured videos, etc.). Thus, FIG. 9 illustrates an exemplary interface for viewing recorded videoconferences. The interface may be hosted by the recording server or another server, as desired.

In further embodiments, the MCU and/or endpoint and/or the recording server may be configured to use speech to text to transcribe the videoconference, e.g., into English or translated to other languages (assuming the videoconference is performed in English). Accordingly, this text may be overlaid on the video (or incorporated into the video) when provided to the recording server and/or the client (depending on whether the endpoint or the recording server performs the transcription). Additionally, the text may be searchable, e.g., by the client. Accordingly, the client may search for specific text in the videoconference. The search results may return in various manners. For example, in one embodiment, the client may present a text transcription of the videoconference and the user may view the transcription at the portion that has the searched text. Additionally, or alternatively, the text may be associated with specific time frames of the videoconference (e.g., when those words were spoken) and the user may be able to skip to that portion of the videoconference for viewing. For example, a user may be able to select a search result and the recording may be automatically played at the portion of the recording that corresponds to the search result. In further embodiments, users may be able to search across a plurality of recordings (e.g., all recordings on a server) to find a recording whose transcript contains specified text (or otherwise matches the search criteria). In such embodiments, a list of matching recordings might be shown, and results within each recording may be provided in the manner described above, although other implementations are envisionsed. Additionally, the generated transcripts may be edited by users, e.g., those users who have access to perform editing, such as the creator of the videoconference or other participants.

Thus, in some embodiments, additional features may be available to users viewing the recorded videoconference, e.g., after the videoconference has been performed.

Figure 10:
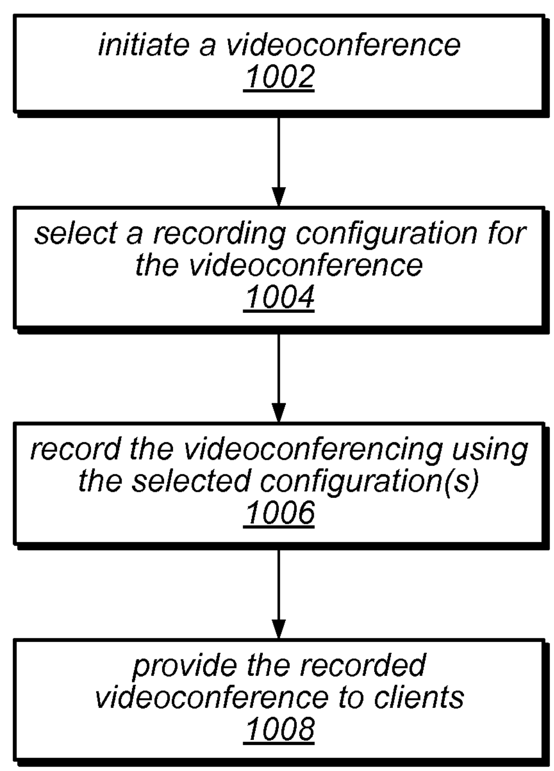
FIG. 10 is a flowchart diagram illustrating an embodiment of a method for recording a videoconference using configurations.

FIG. 10—Recording a Videoconference Using Configurations

FIG. 10 illustrates a method for recording a videoconference using configurations. The method shown in FIG. 10 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1002, a videoconference may be initiated or performed, similar to 602 above. As already described, one of the videoconferencing endpoints or units may act as an MCU for the videoconference and may be coupled to a recording server.

In 1004, one or more configurations may be selected for recording the videoconference. These configurations may have been previously created by a user, e.g., before the videoconference is initiated in 1002. The configuration may specify any of various parameters for recording the videoconference. For example, the configuration may specify the quality of the recording, resolution, streaming bitrate, encoding format, frame rate, how often iframes should be generated, audio/video codec, aspect ratio, and/or recording metadata, such as recording description(s), ownership information, viewing authorization, and recording categorization (e.g., a channel to which the recording should be added or storage directory). The configuration may also indicate if the videoconference should be recorded and/or streamed live. Further, the configuration may specify a recording server, e.g., the address of the recording server that should be used. However, in further embodiments, the address of the recording server may be stored or configured separately, e.g., on a per videoconferencing endpoint or unit basis.

Additionally, configurations may be associated with any of a variety of entities. For example, a configuration may be associated with respective users or participants, with a particular videoconferencing location or room, with an videoconferencing endpoint or unit, etc. For example, video endpoints can be preconfigured with configurations (sometimes referred to as "keys" or "pins"), e.g., which may enable the single touch recording described herein. The term "pin" here may refer to a pin number or other identification code used to identify a previously created configuration. In one embodiment, an endpoint owned by a group of users can be preconfigured for one touch recording to record or stream content that is access restricted to the group, e.g., just the members of the group, to the highest access level of the group, to the lowest access level of the group, etc.

There may be more than one configuration associated with a given entity. For example, in some embodiments, users may have or own multiple recording configurations. This may allow them to create recordings and live streams with different recording quality or viewing authorizations. As a specific example, the CTO of a company may have a plurality of different associated configurations, e.g., one for management, one for engineering, one for sales, one for legal, etc. As indicated above, these configurations may specify different viewing rights or locations for publishing, among other possible differences. Further, a user may have more than one key to specify the different bitrates or codecs that should be generated for videoconferences, e.g., to support his different devices. More specifically, the user may want to support his mobile device and computer, and may have a different configuration for each. Both configurations may be used for a given videoconference, so that either device could view the videoconference, if desired.

FIG. 11 illustrates an exemplary screen shot of an interface for managing configurations (shown as "recording keys"). In this embodiment, the user "administrator" has an associated configuration "6512". This configuration has an associated name ("1 Mbps"), channel ("main", where associated videoconferences may be published), viewing rights ("everyone"), whether it is recorded ("yes"), whether it is streamed live ("yes"), a description (left blank), associated tags ("demo at 1 Mbps"), bitrate ("1024"), and presentation bandwidth ("70"). Note that the information stored in this configuration is exemplary only and other settings and fields are envisioned.

In some embodiments, the configurations may be selected before or during the videoconference, as desired. For example, the configurations may be selected prior to the videoconference, prior to recording (e.g., but during the videoconference), or at the time the recording is initiated. Additionally, the configurations may be fully specified before selection or may be specified during selection, e.g., when recording is invoked.

Further, the configurations may be selected automatically (e.g., by a computer system (e.g., the videoconferencing unit) without user input specifying the configurations) and/or manually. For example, for manual selection, one or more of the participants may select the configuration(s) using a remote or other input device. Note that the manual selection may be performed in addition to automatic selection, if desired.

For automatic selection, the MCU, endpoint(s) or recording server may be configured to perform the selection. In a simplistic case, the MCU may use default configuration(s), e.g., associated with the MCU and/or the endpoints of the videoconference. However, the automatic selection may be more sophisticated. For example, when a recording is initiated, the MCU, one of the videoconferencing units, and/or the recording server may be configured to use voice/face recognition to identify participants of the videoconference. For example, in one embodiment, the voice and/or face recognition may be based on videoconferencing information received from the endpoint that originated the recording to identify the participant(s) who initiated the recording. Alternatively, the participants of the videoconference may already be known (e.g., specified in a videoconference request or call) or may be specified by the participants, as desired. Accordingly, the configuration(s) associated with those participant (s) may be selected.

The endpoint (e.g., from the recorder) can offer to start a recording/streaming session using one of the recording user's profiles. Following this example, the recording's ownership can be assigned to the user initiating the recording. This allows users to record/stream without having to remember recording configuration(s). However, the selected configurations could be based on other participants of the videoconference instead of or in addition to the initiating participant, as desired.

In 1006, the conference may be recorded based on the one or more configurations specified in 1004. The conference may be recorded similar to the description above regarding 606. However, the recording server may record or store the videoconference based on the selected configurations. For example, the recording may be created using the configuration or a profile associated with the configuration (e.g., which may have been preconfigured). In one embodiment, the streaming/recording server may store multiple recording profiles that specify streaming bitrate, codecs and recording metadata. Recording metadata may include a recording description, ownership information, viewing authorization and recording categorization (channel), among other possibilities. A profile may also identify if the content should be recorded and/or streamed live. Each recording profile may be associated with a configuration (e.g., a key or pin) described above. In some embodiments, video endpoints can download recording profiles from the recording server for a key entered by a user and generate the appropriate stream.

In 1008, the recorded videoconference may be provided to one or more clients, similar to 608 described above.

Embodiments described above may also apply to streaming videoconferences (e.g., instead of recording videoconferences). In such embodiments, similar configurations may be used (except those related to the stored recordings) and may be referred to as "streaming configurations" rather than "recording configurations".

Figure 12:
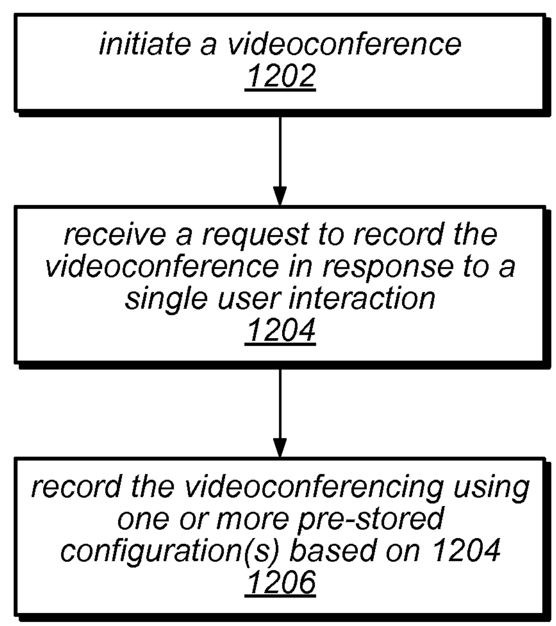
FIG. 12 is a flowchart diagram illustrating an embodiment of a method for recording a videoconference in response to a single user interaction.

FIG. 12—Recording a Videoconference in Response to a Single User Interaction FIG. 12 illustrates a method for recording a videoconference in response to a single user interaction. The method shown in FIG. 12 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1202, a videoconference may be initiated or performed among a plurality of videoconference endpoints, as described in 602 above.

In 1204, a request to record the videoconference may be received in response to a single user interaction. For example, the single user interaction may be one of the participants, e.g., at an endpoint, utilizing a remote device, e.g., to press a record button. The remote device may include a remote control, a touch device, a speakerphone, etc. For example, the user may select a record button that is dedicated to initiating recording of the videoconference. In further embodiments, the user may use a single user interaction provided by applications running on devices, e.g., on touch devices such as mobile phones or tablet devices, on netbooks or laptops, etc.

Other single user interactions are envisioned. For example, a participant may use a voice command to initiate the recording. Alternatively, or additionally, the participant may use a laptop to provide a command to the endpoint or recording server to initiate the recording. In one embodiment a gesture may be used (e.g., on a touch screen or provided to a camera of the videoconference endpoint, etc.). The participant may use a mouse to select a button to initiate the recording. Regardless of the method used, only a single interaction of the user may be required to initiate the recording of the videoconference. For example, the participant may not have to go through a tedious set of inputs to initiate the recording, but may simple provide one interaction or input to initiate the recording of the videoconference. Additionally, the participant may not need to specify a recording configuration in order to initiate the recording of the videoconference.

In 1206, recording of the videoconference may be initiated in response to the request in 1204. The recording of the videoconference may be performed as described herein. Note that no further user interaction may be required to initiate (or even to perform) the recording other than the single user interaction of 1204. Thus, in one embodiment, the participant may only provide the single user interaction and no further interaction may be required for the recording to begin. The recording may be performed utilizing one or more pre-stored recording configurations, such as those described above, among others. For example, the pre-stored recording configurations may be the recording configurations described in FIG. 10. More specifically, one of the pre-stored configurations used to record the videoconference may be associated with a participant of the videoconference, an endpoint of the videoconference, etc.

The recording configurations may be automatically selected, e.g., by the endpoint receiving the single user interaction, by the MCU, and/or by the recording server. For example, the recording configurations may be automatically selected by using configurations associated with participants in the videoconference, e.g., using one or more recording configurations associated with the participant providing the input to initiate recording, associated with the endpoint that receives the input, associated with the participant that requested or initiated the videoconference, associated with the highest ranking participant in the videoconference, associated with the recording server (e.g., a default recording configuration), etc. In this embodiment, the participant may not provide any input other than the single user interaction to perform the recording. For example, the participant may not perform any action prior to or after the single user interaction in order to initiate and/or perform the recording of the videoconference.

Alternatively, or additionally, the recording configurations may include any configurations that participants in the videoconference (or other users) selected prior to initiating the recording, e.g., selected prior to or during the videoconference, but before providing the single user interaction. In one embodiment, participants may specify desired recording configurations when the videoconference is initiated, when the participant accepts an invite to the videoconference, during scheduling, etc. In one embodiment, a first participant may select one or more configurations and a second participant may provide the single user interaction to record the videoconference, e.g., without specifying any configurations.

The method of 1200 may be performed by any of a variety of videoconference equipment. For example, 1204 and 1206 may be performed by an MCU, an endpoint acting as an MCU, or any endpoint of the videoconference, as desired. For example, the request may be provided as user input to the MCU or endpoint. Alternatively, 1204 and 1206 may be performed by a recording server in communication with one or more of the videoconference MCU/endpoints. For example, the request may be provided as a message to the recording server to initiate the recording, e.g., from an MCU or endpoint of the videoconference.

Figure 13:
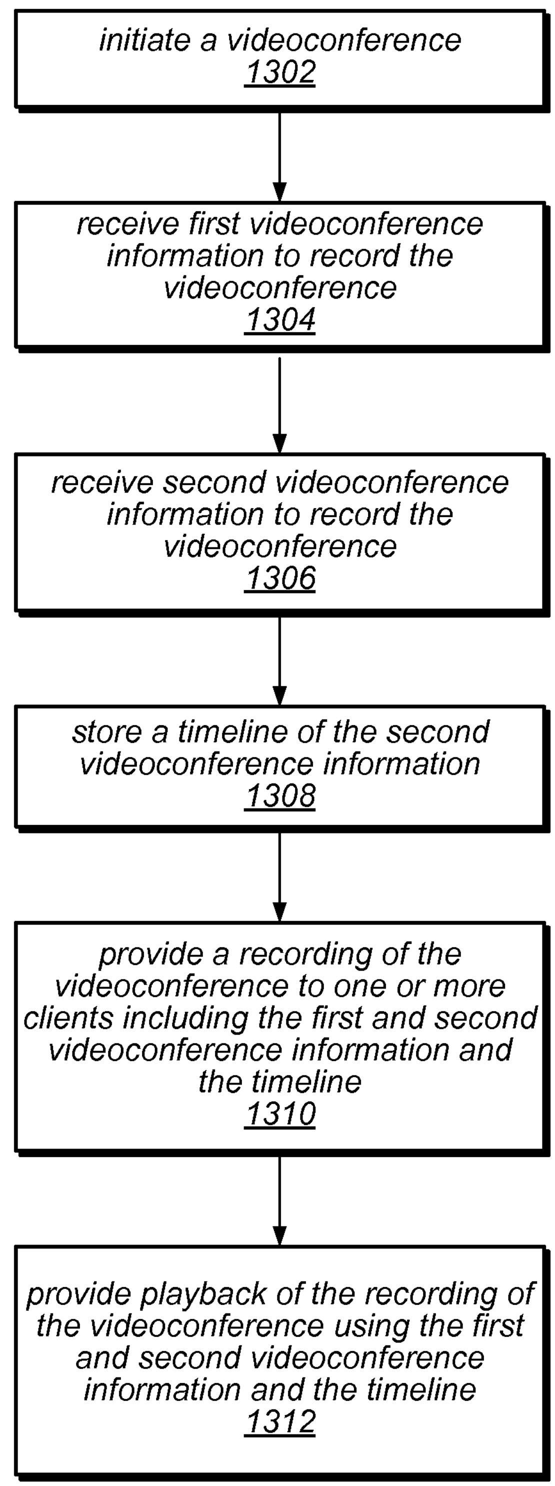
FIG. 13 is a flowchart diagram illustrating an embodiment of a method for recording a videoconference with a separate presentation stream.

FIG. 13—Recording a Videoconference with a Separate Presentation Stream

FIG. 13 illustrates a method for recording a videoconference with separate participant and presentation streams. The method shown in FIG. 13 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1302, a videoconference may be initiated or performed among a plurality of videoconference endpoints, as described in 602 above.

In 1304, first videoconference information may be received for recordation. The first videoconference information may correspond to participants in the videoconference. The first videoconference information may be received by a recording server, e.g., from an MCU of the videoconference and/or an endpoint of the videoconference, as desired. As used herein, videoconference information that "corresponds to participants in the videoconference" (or "participant videoconference information") refers to video and/or audio that generally include the participants. For example, video that corresponds to participants generally includes video of participants at a corresponding videoconference location. While the participant(s) may not always be displayed, e.g., when the participant steps away from the camera, the primary purpose of the video is for displaying images of the participant(s). Thus, the video that corresponds to participants may include an image of at least one participant for more than 50% of the time. Note that the percentage may typically be higher, e.g., 70%, 80%, 90%, 95%, 100%, etc.

In 1306, second videoconference information may be received for recordation. The second videoconference information may be received by a recording server, e.g., from an MCU of the videoconference and/or an endpoint of the videoconference, as desired. The second videoconference information may correspond to auxiliary video of the videoconference. The second videoconference or auxiliary videoconference information may be any videoconference information that does not correspond to the participants of the videoconference. For example, the second videoconference information may correspond to a presentation presented during the videoconference (e.g., may be "presentation videoconference information"). For example, the second videoconference information may include video of slides of a presentation as one of the participants discusses the various slides. The presentation video may further include video of the participant interacting with the slides (e.g., using a mouse to point at various portions within a slide, highlighting various portions, etc.). In one embodiment, the presentation video may include video provided from a participant's computer, e.g., as the participant executes programs on the computer. In alternated embodiments, the presentation video may include video of a presentation provided via a projection machine or other mechanism. However, as indicated above, the second videoconference information may not be presentation information, but may generally be videoconference information that does not correspond to participants of the videoconference, since that information is already received in 1304.

In some embodiments, the second videoconference information may not be present for a portion of the videoconference. For example, one of the participants may present a presentation during the videoconference for less than the entirety of the videoconference (e.g., for 5 minutes within the 30 minute videoconference). Note that the second videoconference information may be present a plurality of different times throughout the videoconference. For example, the videoconference may begin and participants of the videoconference may discuss various matters for a first time period, and no second videoconference information may be present during the first time period. At a second time period, a first participant may present a presentation. At a third time period, after the first participant has finished providing the presentation, and no second videoconference information may be present during the third time period. At a fourth time period, a second participant may provide video from his computer, e.g., to illustrate a program or graph that is pertinent to the conversation. Thus, in this particular example, the second videoconference may be present during the second period and the fourth period, but not during the first and third periods. Additionally, it should be noted that the second videoconference information may be of different natures, where there is a plurality of different types of second videoconference information. For example, each different second videoconference information may not be a presentation or of the same type of videoconference information (e.g., one may correspond to a presentation while another may correspond to a different type of second videoconference information).

In 1308, a timeline of the second videoconference information may be stored for recording the videoconference. The timeline may specify when the second videoconferencing information was present in the videoconference. The timeline may be received by a recording server, e.g., from an MCU of the videoconference and/or an endpoint of the videoconference, as desired. Alternatively, or additionally, the timeline may be generated by the recording server, e.g., as the first and second videoconference information is received from the MCU or endpoint of the videoconference. For example, the recording server may store the times when the received second videoconference information begins and ends during the videoconference, e.g., relative to the beginning of the videoconference (when the first videoconference information is initially received).

In 1310, a recording of the videoconference may be provided to one or more clients. The recording of the videoconference may supply the first videoconference information, the second videoconference information, and/or the timeline of the second videoconference information in a single stream or package or may provide them separately as desired. For example, the recording of the videoconference may include only the first videoconference information at a first time (e.g., at the beginning of the videoconference). The timeline may be provided separately (e.g., from the first videoconference information or the recording) or may be provided with the first videoconference information. Later, the second videoconference information may be provided (e.g., when the second videoconference information was originally present in the videoconference). This second videoconference information may be provided with the first videoconference information in the recording or may be provided separately, as desired. In one embodiment, the first and second videoconference information may be provided initially, even if the second videoconference information is not present in the videoconference until a later time. Accordingly, the client may be able to buffer or store the second videoconference information and begin playback of the second videoconference information at a later time, based on the received timeline of the second videoconference information.

Similar to descriptions above, the recording (e.g., the first videoconference information and/or the second videoconference information) may be formatted or provided to the clients without substantial modification since being received in 1304 and 1306. Also, similar to embodiments above, the first videoconference information and second videoconference information may be different than the videoconference information provided among the plurality of endpoints in the videoconference. For example, the original videoconference information (whether it be participant videoconference information or auxiliary videoconference information) provided to endpoints may not include periodic iframes or may not be in the streaming friendly format of the first and second videoconference information. However, in other embodiments, the first and second videoconference information may be transcoded or modified before being provided to the clients, as desired.

In 1312, the one or more clients may playback the recording of the videoconference. More specifically, the one or more clients may use the timeline to appropriately display the second videoconference information during playback of the recording of the videoconference. The first videoconference information may be played back for the duration of the playback of the recorded videoconference.

In one embodiment, each client may provide the first videoconference information for playback on the display of the client, determine a first point in the videoconference when a portion of the second videoconferencing information begins using the timeline, and provide the second videoconference information for playback on the display at the first point. Further, each client may determine a second point in the videoconference when the portion of the second videoconferencing information ends using the timeline, and cease providing the second videoconference information for playback on the display at the second point. This process may be repeated a plurality of times for each time period that the second videoconference information is present.

Figure 14:
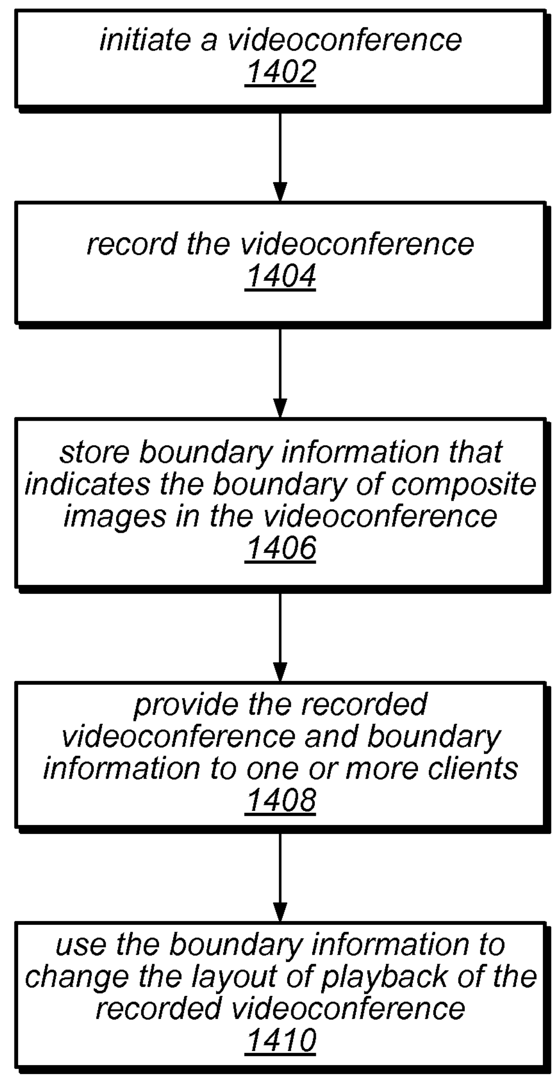
FIG. 14 is a flowchart diagram illustrating an embodiment of a method for recording a videoconference including boundary information.

FIG. 14—Recording a Videoconference Including Boundary Information

FIG. 14 illustrates a method for recording a videoconference with boundary information of a composite image. The method shown in FIG. 14 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1402, a videoconference may be initiated or performed among a plurality of videoconference endpoints, as described in 602 above.

In 1404, the videoconference may be recorded, according to any of the embodiments described herein. The recorded videoconference may include composite images or may be a composite video. As discussed above, the composite images may include a plurality of participant images in respective portions of the composite image. However, it should be noted that some portions of the composite images may not correspond to participants, but may be other video, such as presentations or other video. Thus, the recorded videoconference may include audio/video of the participants, audio/video of a presentation, etc.

In 1406, boundary information of the videoconference may be stored which indicates the boundary of the composite images in the recorded videoconference. Note that the boundary information may be stored as part of the recorded videoconference or may be stored separately, as desired. Additionally, the boundary information may be received as part of, or separately from, the videoconference information used to record the videoconference. For example, an endpoint may provide the videoconference information to record the videoconference and may also provide the boundary information of the videoconference information (e.g., which may be included in the videoconference information or provided separately, as desired).

In 1408, the recorded videoconference and boundary information may be provided to one or more clients. Each client may execute software (e.g., a videoconference or video player) to playback the recording to one or more users of the client. The client may be any of various devices, such as a computer, a mobile device, a tablet, a mobile phone, etc.

In 1410, a client may use the boundary information to change the layout of playback of the recorded videoconference. For example, the client may begin playback of the recorded videoconference according to a first layout (e.g., the layout that the videoconference was originally recorded in). During playback, a user of the client may request a change in layout of the videoconference. For example, the user may select a new desired layout from a plurality of possible layouts, e.g., which may be displayed in a graphical manner on the client display. Alternatively, or additionally, the user may select a "change layout" option and the client may cycle from a current layout to a new layout, e.g., in a cyclical order. In further embodiments, the user may be able to manually select portions of the layout and move, resize, or delete them. For example, the user may drag a border within the composite image to increase or decrease the relative sizes of portions within the layout. Alternatively or additionally, the user may select one of the portions and choose various options for that portion, e.g., increase size, decrease size, maximize size, minimize size, remove, split, etc.

In some embodiments, the layout of the playback of the recording may change automatically. For example, if one of the participants in the videoconference begins a presentation and new presentation data is provided for display, the client may automatically change the layout of the playback of the recording in order to provide the presentation video for display. Similarly, when the new presentation ends, the client may automatically change the layout of the playback of the recording to remove the presentation from being displayed (e.g., thereby reallocating the presentations portion to other video). Additionally, the layout of the playback of the recording may change as new users are added or removed, as the active talkers in the videoconference change, etc.

Accordingly, the client may use the provided boundary information to change the layout of the recorded videoconference in response to the user's input. Note that this change in layout may not change the underlying recording, but instead may simply change the presentation of the recorded videoconference for that particular client. More particularly, the change in layout may be performed locally by the client and not change any data of the recorded videoconference.

In addition to the boundary information, transcript information of the videoconference may be stored and/or provided to the one or more clients. In one embodiment, the one or more clients may be configured to utilize the transcript as subtitles of the recorded videoconference or for searching the videoconference. For example, a user of the client(s) may search for a portion of the videoconference using keywords. In response, the client may search the transcript for those keywords and allow the user to skip to the corresponding portion in the videoconference. As one example, the user may search for the word "soccer" and the client may move playback of the recorded videoconference to a portion of the videoconference where one of the participants said the word "soccer". The client may also provide a list of search results and the user may be able to select each instance of the results to view the corresponding portion of the recorded videoconference.

Figure 15:
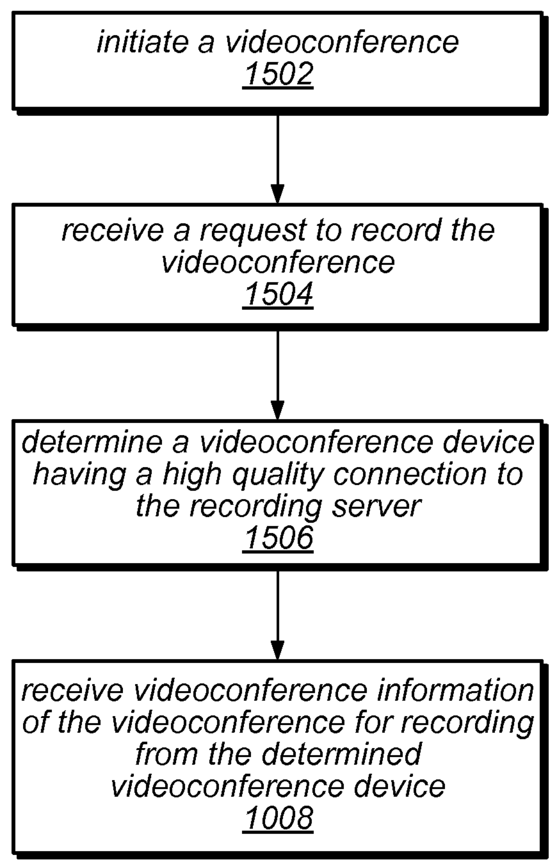
FIG. 15 is a flowchart diagram illustrating an embodiment of a method for recording a videoconference based on connection quality.

FIG. 15—Recording a Videoconference According to Connection Quality

FIG. 15 illustrates a method for recording a videoconference based on connection quality. The method shown in FIG. 15 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1502, a videoconference may be initiated or performed among a plurality of videoconference endpoints, as described in 602 above.

In 1504, a request to record the videoconference may be received. The request may be received from a user, e.g., by an endpoint of the videoconference. For example, the request may include the user providing input to request to record the videoconference Alternatively, or additionally, the request may be received from a recording server from an endpoint or MCU of the videoconference. For example, the recording server may receive a message requesting to record the videoconference from the MCU of the videoconference. The request may generally be generated or received according to any of the embodiments described above, e.g., in with respect to FIG. 6.

In 1506, a videoconference device (e.g., an endpoint and/or MCU) having a high quality connection to the recording server may be determined. This determination may be performed by the recording server (e.g., by the recording server measuring connection quality between each endpoint) and/or by each videoconference device participating in the videoconference. Generally, the determination of the high quality connection may be determined by any involved device.

In one embodiment, the method may determine the high quality connection by determining which videoconference device(s) are on the same local area network as the recording server. For example, the method may generally assume that any local area network connection is of higher quality than wide area network connections (e.g., Internet connections). Alternatively, or additionally, the high quality connection may be determined by detecting packet loss or bandwidth available between the videoconference device(s) and the recording server. For example, the connection may be determined as being "high quality" if the packet loss is below a threshold, if the bandwidth exceeds a threshold, etc. Generally, the videoconference device having the highest quality connection (e.g., according to whichever metric that is being used) may be the determined videoconference device for providing videoconference information of the videoconference to the recording server for recording.

However, it should be noted that there may be a determination of capacity that has a higher or lower priority than the connection quality. For example, the connection quality may only be determined for videoconference devices that have the processing or bandwidth capacity to provide the videoconference information for recording. Alternatively, the connection quality may be determined for all available videoconference devices and the capacity of the videoconference devices may be used to break ties between videoconference devices having similar connection qualities.

Where a high quality connection is not determined, the highest available connection quality of the available videoconference devices may be used. The highest quality connection may be determined according to the metrics described above, e.g., based on packet loss, bandwidth, etc., among other possible metrics.

Additionally, or alternatively, the videoconference device may be determined according to which device requires the least (or is among a subset that requires a lower amount of) effort in traversing a firewall/NAT setup.

In 1508, the determined videoconference device may provide videoconference information for recording the videoconference to the recording server. The videoconference information received in 1610 may be similar to the videoconference information received for recording described above, e.g., in 606 above. For example, the videoconference information may be "streaming friendly" and require little or no modification for provision to clients (at least for a first recording format), or not, as desired.

By determining and using a connection with high quality, the quality of the recording may be improved. For example, recording a videoconference when using a connection with less quality, the quality of recording may be affected by bandwidth fluctuations and packet loss. It should be noted that the recording server may generally have the ability to re-request portions of a videoconference that have been affected by connection issues, and so a minimum level of quality may be maintained via this mechanism. Further, various forward error correction procedures may be used to reduce packet loss. However, it is still generally preferred that a high quality connection be used to avoid the complication of such procedures.

Note that the determination of the high quality connection may be determined a plurality of times (e.g., periodically) during the videoconference. For example, the method may determine if the current videoconference device still has a high quality connection and/or if another videoconference device has a better connection. If the connection quality has sufficiently deteriorated or if another connection is sufficiently better, the provision of the videoconference information in 1508 may be changed to another videoconference device. Alternatively, or additionally, this update of the determination may be performed whenever the quality of connection of the videoconference device drops to an unacceptable level, e.g., when the connection drops, packet loss exceeds a threshold, bandwidth is lower than a specified threshold, etc.

Exemplary Embodiment According to the Method of FIG. 15

The following describes an exemplary embodiment according to the method of FIG. 15.

A videoconference may be established between a plurality of videoconferencing endpoints. At some point prior to or during the videoconference, a request to record the videoconference may be received. For example, a user may press a record button, or some other action may trigger recording (e.g., the recording may begin automatically). In one embodiment, the endpoint that receives the user input or otherwise is involved in initiating the recording process may send a message to other videoconference devices capable of providing videoconference information to the recording server. For example, the message may provide details regarding the requested recording (e.g., an address of the recording server, desired recording configurations or formats, etc.). The message may also specify the quality of connection between the endpoint and the recording server. For example, the quality of connection may be specified as a "recording metric".

In response, any videoconference device that has a better recording metric (e.g., and has the capacity to perform the recording activity) may provide a response to the initiating videoconference endpoint and perform the provision of videoconference information to the recording server. The new videoconference device may provide the videoconference information according to the specified recording configuration, as specified by the initial message above, or a subsequent message once the new videoconference device has been assigned the task.

The method may be extended to videoconference devices that are not able to perform the provision of the videoconference information to the recording server. For example, a user of such a videoconference device may request recording of the videoconference, and that device may offload the provision of the videoconference information to another device that is capable of performing the task. As a specific example, a computer videoconferencing application may be able to participate in videoconference, but may not be configured to provide the videoconference information for recording. Accordingly, the task may be offloaded to a dedicated videoconference endpoint instead, following the descriptions above.

In addition to the above embodiment, the method may be extended. For example, if an MCU is involved in the videoconference, the MCU may take over the recording.

Figure 16:
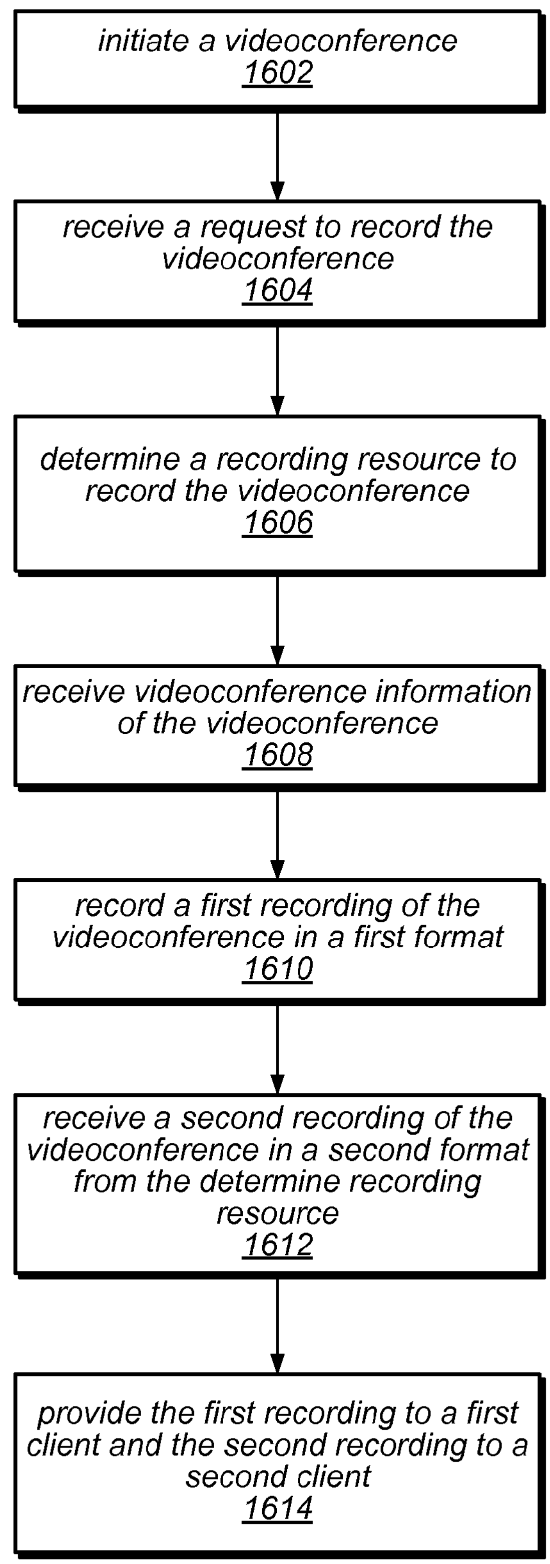
FIG. 16 is a flowchart diagram illustrating an embodiment of a method for recording a videoconference according to a plurality of formats.

FIG. 16—Recording a Videoconference According to a Plurality of Formats

FIG. 16 illustrates a method for recording a videoconference according to a plurality of formats. The method shown in FIG. 16 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1602, a videoconference may be initiated or performed among a plurality of videoconference endpoints, as described in 602 above.

In 1604, a request to record the videoconference may be received. The request may specify a plurality of desired recording formats. For example, the request may specify a one or more different recording configurations which may overall specify a plurality of desired recording formats for the recording of the videoconference. Alternatively, the recording formats may be specified manually by a participant of the videoconference (or other user), determined automatically by the recording server, MCU, or endpoint of the videoconference, etc.

In 1606, one or more recording resources may be determined for recording the videoconference according to at least one of the plurality of recording formats. As used herein, a "recording resource" may be any device that is capable of recording a videoconference, e.g., based on received videoconference information. In some embodiments, this determination may be performed by providing a request to various videoconference devices or other devices. For example, the recording server may send a request to various videoconference devices participating in the videoconference (or other devices that are not participating in the videoconference) to record the videoconference according to one of the plurality of recording formats. In further embodiments, the request may be provided by other entities than the recording server, e.g., the MCU of the videoconference, an endpoint of the videoconference (e.g., the endpoint that initiated the recording, possibly in response to user input), etc. Recording resources with adequate processing capability may respond to the request to perform the recording of the videoconference. Alternatively, or additionally, recording may simply be assigned to one of the recording resources.

In some embodiments, similar to embodiments described above with respect to FIG. 15, the determination of the recording resource may be based on the quality of connection between the recording resource and the recording server. Alternatively, or additionally, the determination of the recording resource may be based on the quality of connection between the recording resource and the videoconference device providing videoconference information of the videoconference (e.g., where the videoconference information is provided directly to the recording resource instead of through the recording server, as described below). In further embodiments, the determination of the recording resource may simply be based on the quality of the videoconference information that the recording resource can receive, regardless of the source. Thus, various quality information (e.g., connection quality information) may be used to determine the recording resource.

In 1608, the videoconference information of the videoconference may be received for recording. Note that 1608 may apply to both the recording server and the determined recording resources. As indicated above, the videoconference information may be provided simultaneously to both the recording server and the determined recording resource, or it may be provided in sequence, e.g., where the recording server receives the videoconference information and then provides the videoconference to the recording resource so that the recording resource can generate a second recording of the videoconference in a second recording format. Alternatively, if the determined recording resource is participating in the videoconference (e.g., if it is an endpoint), it may simply use the normal videoconference information of the videoconference rather than receiving the videoconference information that is provided to the recording server in 1608.

In 1610, the videoconference information may be recorded according to a first recording format to generate a first recording of the videoconference. Note that, similar to embodiments described above, the videoconference information received in 1608 may already be substantially in the first recording format or may be in a format that requires transcoding in order to generate the recording in the first recording format, as desired. For example, the videoconference information received in 1610 may be already in substantially one of the plurality of formats, which may be the first recording format or a different recording format that the recording server may transcode into the first recording format, as desired. The videoconference information received in 1610 may be similar to the videoconference information received for recording described above, e.g., in 606 above.

In 1612, a second recording may be received from the determined recording resources. The second recording may be recorded according to a second recording format that is different from the first recording format. The second recording may be received as a packaged recording or may be received as videoconference information (e.g., similar to 1608), but formatted or transcoded according to the second recording format (or substantially in the second recording format without requiring substantial modification of the videoconference information). Generally, the recording server may perform the bulk of the required transcodings and this offloading of transcoding or recording may be performed when the recording server lacks capacity.

In 1614, the first and second recordings may be provided to first and second clients, e.g., simultaneously. For example, the recording server (or a separate streaming server) may receive a first request to view the videoconference from a first client and may receive a second request to view the videoconference from a second client. The method may determine that the first client requires the first recording format and the second client requires the second recording format. For example, the first request may specify the first recording format and the second request may specify the second recording format. Alternatively, the formats may be determined based on the clients themselves. For example, the method may determine that the first client is a mobile phone and provide the recording in a format that is appropriate for the device type of the first client (in this particular case, a lower resolution format may be selected). Similarly, the method may determine that the second client is a laptop computer and may provide a format that is appropriate for computers (e.g., one that is a higher resolution than the first format). Note that the provision of the first and/or second recordings may be performed during the videoconference or after completion of the videoconference, as desired. The offloading of transcoding or recording may be especially beneficial in embodiments where the first and second recordings are performed during the videoconference, since they cannot be produced over time, as capacity allows. The provision of the first and second recordings may be performed substantially in real time with respect to the videoconference (e.g., with less than 1 second delay, 2 second delay, 5 second delay, 10 second delay, 30 second delay, etc.).

In further embodiments, instead of, or in addition to the plurality of formats being determined by the request to record the videoconference or other devices recording or participating in the videoconference, the desired recording formats may be selected based on requests received from clients to view the videoconference. For example, the recording server may offload recording or transcoding operations in response to requests from clients to view the recording in a format that is not currently available. Thus, the recording server may generate recordings of the videoconference (e.g., itself or in a distributed manner) in response to requests from clients. The recording server may then provide the newly created recording to the client in response to the request. In some embodiments, the recording server may be able to do this substantially in real time, such that the client may receive the newly created recording on demand. The recording server may perform this by streaming the newly created recording as it is generated, whether it is being generated by the recording server or by another recording resource. In the instance of another recording resource performing the recording generation, the new recording may be streaming from the recording resource to the recording server, which may in turn stream the new recording to the client. Alternatively, the new recording may be streamed directly from the recording resource to the client, as desired.

Exemplary Embodiment of the Method of FIG. 16

The following provides an exemplary embodiment of the method of FIG. 16.

A videoconference may be performed between three endpoints and one or more of the endpoints may be able to record the videoconference. Additionally, one or more of the endpoints may have a high quality connection to a recording server (e.g., they may be on the same local area network as the recording server).

A participant at one of the endpoints (e.g., endpoint "A") may provide user input to initiate the recording, e.g., by pressing a record button. The participant may or may not specify a recording configuration (e.g., using a PIN or KEY, or via other mechanisms). As indicated above, the recording configuration may specify which channel the recording should be published to, whether it should be capable of being streamed or not, viewing rights required to access the recording, etc. The recording configuration may also specify all of the formats that should be available, e.g., while the videoconference is being performed (e.g., for live streaming of the recording). In some embodiments, this information may be referred to as "transcode details".

Endpoint A may examine the recording configuration and/or transcode details. Endpoint A, or another videoconference device may then poll other endpoints in the videoconference to determine which endpoint is able to perform the extra transcoding work needed to be done for the recording. In one embodiment, each other endpoint in the videoconference may be able to transcode a single format of recording responsibility, and the remainder of the transcoding may be performed by the recording server, although other embodiments are envisioned. Additionally, other endpoints (or other recording resources) that are not participating in the videoconference may be used to perform the transcoding work, as desired. However, endpoints that are not capable of performing the additional work, or who otherwise do not wish to take up the additional load, may not respond to the query from endpoint A.

Finally, the endpoints may perform the transcoding according to the determination above and provide the properly formatted recording or videoconference stream to the recording server. The recording server may then stream the plurality of formatted recording to clients, e.g., during or after the videoconference. As indicated above, in some embodiments, the streaming may be performed substantially in real time with respect to the videoconference.

Further Embodiments

In further embodiments, the endpoint and/or recording server can also use face and/or voice recognition on videos from all participating endpoints to determine participant names. The recording can be tagged with the participant information determined to enable search queries based on participants. The recorder can also offer to store the recording with viewing privileges restricted to the group of call participants. Thus, image and voice profiles can be used to identify participants in recordings and live streams. Image and voice recognition can augment each other to increase the accuracy of determining a user in a video.

In some embodiments, the endpoint and recording server may generate voice and facial profiles to enable the automatic detection of participants (e.g., for selecting configurations) described above. For example, sections of video recordings on the recording server can be tagged with the name of the active speaker. This information from multiple recordings can be used to create a voice and/or face profile for the user. In further embodiments, the recording server can store uploaded photos of users in their user profiles. Recording viewers can also pause recordings and mark out users in the recording (e.g., to tag participants of the videoconference). Multiple uploaded images and tagged images from recordings can be used to create an image profile of the user.

Additionally, it should be noted that any of the embodiments described above regarding recording or recordings of a videoconference may be extended to streaming the videoconference (e.g., without recording the videoconference). For example, instead of recording a videoconference and providing the videoconference to clients, the videoconference may be provided to a streaming server and the streaming server may provide the recording to clients in addition to or without recording the videoconference. Further, embodiments described above may be modified for instances for broadcasting from a single videoconferencing location, e.g., where a user would like to record or stream only his video/audio to a plurality of clients. Thus, instead of recording a videoconference, a user may record and/or broadcast information from a videoconferencing endpoint.

Advantages Over Prior Systems

The above described embodiments may have numerous benefits over prior methods for recording videoconferences. For example, previous recording systems typically required a recording device to participate in the videoconference, thereby taking a port of the MCU as well as valuable screen resources on each other participant's screen. In embodiments described above, the video stream sent to the recording server is sent independently, and does not involve the recording server acting as a participant or use in the composite image sent by the endpoint. Additionally, the recording server may not receive any video or composite section that corresponds to the recording server, and therefore also does not have to remove itself from the recorded videoconference.

Further, in embodiments described above, the audio and video sent to the recording server may be independent from any of the streams sent to the other participants. For example, the audio and video sent to the recording server may be unique or different from any of the audio and video sent to the other endpoints of the videoconference, unlike prior systems.

Additionally, in embodiments where the endpoint transmits the video to the recording server in a "streaming friendly" manner (e.g., including periodic i-frames), the recording server may retransmit the video of the videoconference without having to perform inefficient transcoding procedures before transmission, which has been previously required. Such functionality allows the recording server to transmit the videoconference information to many more clients (at the same time) than was previously possible.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory computer-readable memory medium comprising program instructions for recording a videoconference, wherein the program instructions execute during a videoconference, wherein the program instructions are executable to:

in response to a request to record a videoconference, determining a first endpoint, from among a plurality of endpoints participating in the videoconference, having a high quality connection between the first endpoint and a recording server, wherein the recording server is configured to record the videoconference, and wherein each endpoint of the plurality of endpoints comprises a camera, microphone, display device, and speakers for enabling a videoconference participant to participate in the videoconference;

wherein the first endpoint is configured to provide videoconference information to the recording server for recording the videoconference based on said determining that the first endpoint has the high quality connection between the first endpoint and the recording server, wherein the videoconference information provided from the first endpoint to the recording server comprises audio and video from multiple endpoints in the videoconference.

2. The non-transitory computer-readable memory medium of claim 1, wherein the request is received from an endpoint or MCU of the videoconference.

3. The non-transitory computer-readable memory medium of claim 1, wherein the request is provided by a user of an endpoint in the videoconference.

4. The non-transitory computer-readable memory medium of claim 1, wherein the request is received by an endpoint of the videoconference.

5. The non-transitory computer-readable memory medium of claim 1, wherein said determining is performed by a recording server.

6. The non-transitory computer-readable memory medium of claim 1, wherein said determining is performed by the first endpoint.

7. The non-transitory computer-readable memory medium of claim 1, wherein said determining is performed by a second endpoint of the videoconference.

8. The non-transitory computer-readable memory medium of claim 1, wherein said determining the first endpoint having the high quality connection comprises determining that the first endpoint and the recording server are on a same local area network.

9. The non-transitory computer-readable memory medium of claim 1, wherein said determining the first endpoint having the high quality connection comprises determining that a connection between the first endpoint and the recording server exceeds a threshold bandwidth.

10. The non-transitory computer-readable memory medium of claim 1, wherein said determining the first endpoint having the high quality connection comprises determining that a connection between the first endpoint and the recording server is less than a threshold amount of packet loss.

11. A method for recording a videoconference, wherein the videoconference is performed among a plurality of endpoints, the method comprising:

in response to a request to record a videoconference, determining a first endpoint, from among the plurality of endpoints, having a high quality connection to the recording server, wherein the recording server is configured to record the videoconference, and wherein each endpoint of the plurality of endpoints comprises a camera, microphone, display device, and speakers for enabling a videoconference participant to participate in the videoconference;

wherein the first endpoint is configured to provide videoconference information to the recording server for recording the videoconference based on said determining that the first endpoint has the high quality connection to the recording server, wherein the videoconference information provided from the first endpoint to the recording server comprises audio and video from multiple endpoints in the videoconference.

12. The method of claim 11, wherein the request is received from an endpoint or MCU of the videoconference.

13. The method of claim 11, wherein the request is provided by a user of an endpoint in the videoconference.

14. The method of claim 11, wherein the request is received by an endpoint of the videoconference.

15. The method of claim 11, wherein said determining is performed by a recording server.

16. The method of claim 11, wherein said determining is performed by the first endpoint.

17. The method of claim 11, wherein said determining is performed by a second endpoint of the videoconference.

18. The method of claim 11, wherein said determining the first endpoint having the high quality connection comprises determining that the first endpoint and the recording server are on a same local area network.

19. The method of claim 11, wherein said determining the first endpoint having the high quality connection comprises determining that a connection between the first endpoint and the recording server exceeds a threshold bandwidth.

20. The method of claim 11, wherein said determining the first endpoint having the high quality connection comprises determining that a connection between the first endpoint and the recording server is less than a threshold amount of packet loss.

21. A non-transitory computer-readable memory medium comprising program instructions for streaming a videoconference, wherein the program instructions execute during a videoconference, wherein the program instructions are executable to:

in response to a request to stream a videoconference, determining a first endpoint, from among a plurality of endpoints participating in the videoconference, having a high quality connection between the first endpoint and a streaming server, wherein the streaming server is configured to stream the videoconference, and wherein each endpoint of the plurality of endpoints comprises a camera, microphone, display device, and speakers for enabling a videoconference participant to participate in the videoconference;

wherein the first endpoint is configured to provide videoconference information to the streaming server for streaming the videoconference based on said determining that the first endpoint has the high quality connection between the first endpoint and the streaming server, wherein the videoconference information provided from the first endpoint to the streaming server comprises audio and video from multiple endpoints in the videoconference.

22. The non-transitory computer-readable memory medium of claim 21, wherein the request is received from an endpoint or MCU of the videoconference.

23. The non-transitory computer-readable memory medium of claim 21, wherein the request is provided by a user of an endpoint in the videoconference.

24. The non-transitory computer-readable memory medium of claim 21, wherein the request is received by an endpoint of the videoconference.

25. The non-transitory computer-readable memory medium of claim 21, wherein said determining is performed by a streaming server.

26. The non-transitory computer-readable memory medium of claim 21, wherein said determining is performed by the first endpoint.

27. The non-transitory computer-readable memory medium of claim 21, wherein said determining is performed by a second endpoint of the videoconference.

28. The non-transitory computer-readable memory medium of claim 21, wherein said determining the first endpoint having the high quality connection comprises determining that the first endpoint and the streaming server are on a same local area network.

29. The non-transitory computer-readable memory medium of claim 21, wherein said determining the first endpoint having the high quality connection comprises determining that a connection between the first endpoint and the streaming server exceeds a threshold bandwidth.

30. The non-transitory computer-readable memory medium of claim 21, wherein said determining the first endpoint having the high quality connection comprises determining that a connection between the first endpoint and the streaming server is less than a threshold amount of packet loss.

* * * * *